(12) United States Patent
Mattice et al.

(10) Patent No.: US 8,125,459 B2
(45) Date of Patent: Feb. 28, 2012

(54) MULTI-USER INPUT SYSTEMS AND PROCESSING TECHNIQUES FOR SERVING MULTIPLE USERS

(75) Inventors: Harold E. Mattice, Gardnerville, NV (US); Christian E. Gadda, Las Vegas, NV (US); Chauncey W. Griswold, Reno, NV (US); James W. Stockdale, Clio, CA (US); Richard L. Wilder, Sparks, NV (US)

(73) Assignee: IGT, Reno, NV (US)

( * ) Notice: Subject to any disclaimer, the term of this patent is extended or adjusted under 35 U.S.C. 154(b) by 1140 days.

(21) Appl. No.: 11/865,581

(22) Filed: Oct. 1, 2007

(65) Prior Publication Data
US 2009/0084612 A1 Apr. 2, 2009

(51) Int. Cl.
*G09G 5/00* (2006.01)

(52) U.S. Cl. ...... 345/173; 345/156; 345/1.1; 178/18.01; 178/18.03; 463/30; 463/37

(58) Field of Classification Search .................. 345/156, 345/173–179; 178/18.01–18.09; 463/30–33, 463/37
See application file for complete search history.

(56) References Cited

U.S. PATENT DOCUMENTS

| | | |
|---|---|---|
| 5,854,450 A | 12/1998 | Kent |
| 5,986,224 A | 11/1999 | Kent |

(Continued)

FOREIGN PATENT DOCUMENTS

JP 2000 148396 5/2000

(Continued)

OTHER PUBLICATIONS

Buxton, "Multi-Touch systems that I have Known and Loved," Feb. 9, 2007, from http://www.billbuxton.com/multitouchOverview.htm, 16 pages.

(Continued)

*Primary Examiner* — Quan-Zhen Wang
*Assistant Examiner* — Jennifer Nguyen
(74) *Attorney, Agent, or Firm* — Weaver Austin Villeneuve & Sampson LLP

(57) ABSTRACT

Techniques for providing a common input for multiple users are disclosed. Two separate input detection systems can be provided. One input detection system detects the identity of user while the other detects the location of input for processing. The information provided by the two detection systems is effectively reconciled to determine whether a particular user identified by the first system has provided input in a particular location indicated by the second system. Information can be reconciled, for example, at least partially based on the timing information provided by the two systems (e.g., whether the times indicated by the two systems are within an acceptable range). The first input detection can be provided as a Radio Frequency (RF) system that detects a change in RF energy received by a RF receiver provided in the proximity of a user when the user touches a touchscreen. The second input detection can include an APR (Acoustic Pulse Recognition) or capacitive touchscreen (or multi-touch screen). It will also be appreciated that both input system can be integrated into a single device which can be presented, for example, as multi-user touchscreen. The multi-user touch screen can provide a common input surface to serve numerous applications. For example, a virtual roulette table with a touchscreen surface can be provided for multiple players. The players can interact with the game by touching the touch screen surface provided as a common playing area (e.g., players can place bets by touching various positions of the touchscreen).

24 Claims, 21 Drawing Sheets

U.S. PATENT DOCUMENTS

| | | |
|---|---|---|
| 6,685,567 B2 | 2/2004 | Cockerille et al. |
| 6,723,929 B2 | 4/2004 | Kent |
| 7,061,475 B2 | 6/2006 | Kent |
| 7,728,821 B2 * | 6/2010 | Hillis et al. ............. 345/173 |
| 2002/0185981 A1 | 12/2002 | Dietz et al. |
| 2006/0125804 A1 | 6/2006 | Kent |
| 2006/0197750 A1 | 9/2006 | Kerr et al. |
| 2006/0197752 A1 | 9/2006 | Hurst et al. |
| 2007/0273670 A1 * | 11/2007 | Nordahl ............. 345/173 |
| 2007/0291007 A1 * | 12/2007 | Forlines et al. ............. 345/173 |

FOREIGN PATENT DOCUMENTS

| | | |
|---|---|---|
| JP | 2006 302046 | 11/2006 |
| WO | WO 03/007227 | 1/2003 |
| WO | WO 2005/101173 | 10/2005 |
| WO | WO 2009/045853 | 4/2009 |

OTHER PUBLICATIONS

Tyco Electronics, "Acoustic Pulse Recognition: Breakthrough New Touch Technology for Elo TouchSystems," from media.elotouch.com/pdfs/marcom/apr_wp.pdf - , Tyco Electronics Corporation, 2006. (12 pages).

International Search Report and Written Opinion dated Jan. 8, 2009 issued in PCT Application No. PCT/US2008/077709.

* cited by examiner

MULTI-USER INPUT SYSTEMS AND PROCESSING TECHNIQUES FOR SERVING MULTIPLE USERS

BACKGROUND OF THE INVENTION

In computer (or computing) science, input/output (or I/O) can refer to a collection of interfaces that different functional units (sub-systems) of an information processing system use to communicate with each other. In general, Input can be a signal received by a functional unit, and output can be a signals sent from the functional unit.

Input/output (I/O) devices can be used by a person (or other system) to communicate with a computer. For instance, keyboards and mouses are considered input devices of a computer and monitors and printers are considered output devices of a computer. Typically, devices used for communication between computers are for both input and output (e.g., modems and network cards).

Some input devices (e.g., mouses and keyboards) can receive as input the physical movement provided by a human being and convert it into signals that a computer can understand. The output from these devices is treated as input by the computer. Similarly, printers and monitors take as input signals that a computer outputs and convert them into representations that human users can see or read (the process of reading or seeing the representations can be considered as receiving input.)

Generally, an input device can be considered an interface between a user (e.g., human being, application program) and a machine. The input device's primary function is to receive input from the user and translate it for the machine. A few examples of Input devices are keyboards, mouses, touchpads, touchscreens, trackballs and tablets. Input devices are prevalent in gaming environments. Joysticks, gamepads, power pads and analog sticks are examples of input devices that are often used in gaming environments.

Some devices can effectively provide both input and output. As an example, conventional touchscreens (touchscreens, touch panels or touchscreen panels) are display overlays which have the ability to display and receive information on the same screen. The effect of such overlays allows a display to be used as an input device, removing the keyboard and/or the mouse as the primary input device for interacting with the display's content. Such displays can be attached to computers or, as terminals, to networks. Touchscreens also have assisted in recent changes in the PDA and Cell-Phone Industries, making these devices more usable. Touchscreens have become commonplace since the invention of the electronic touch interface in 1971 by Dr. Samuel C. Hurst. They have become familiar in retail settings, on point of sale systems, on ATMs and on PDAs where a stylus is sometimes used to manipulate the GUI and to enter data. The popularity of smart phones, PDAs, portable game consoles and many types of information appliances is driving the demand for, and the acceptance of, touchscreens.

More recently, "multi-touching" techniques have been developed. Generally, "multi-touch" can refer to a human-computer interaction technique and the hardware devices that implement it. For example, it can refer to a touchscreen (or touch tablet/touchpad) that recognizes multiple simultaneous touch points. The multi-touch screen can be configured to detect the pressure or degree of each touch independently, as well as detecting their individual position. This allows gestures and interaction with multiple fingers or hands, chording, and can provide rich interaction, including direct manipulation, through intuitive gestures. Depending largely on their size, some multi-touch devices support more than one user on the same device simultaneously. One salient aspect of this technique is that it makes easy to zoom in or out in a Zooming User Interface with two fingers, for example, thereby providing a more direct mapping than with a single-point device like a mouse or stylus. Touchscreens (touchscreens, touch panels or touchscreen panels) are display overlays which have the ability to display and receive information on the same screen. The effect of such overlays allows a display to be used as an input device, removing the keyboard and/or the mouse as the primary input device for interacting with the display's content. Such displays can be attached to computers or, as terminals, to networks. Touchscreens also have assisted in recent changes in the PDA and Cell-Phone Industries, making these devices even more usable.

As noted above, input devices, among other places, are prevalent in gaming environments. As such, a modern gaming machine will be discussed. As such, a modern gaming machine is discussed further.

Typically, a gaming machine utilizes a master controller to effectively control various combinations of devices that allow a player to play a game on the gaming machine and also encourage game play on the gaming machine. A game played on a gaming machine usually requires a player to input money or indicia of credit into the gaming machine, indicate a wager amount, and initiate playing a game of chance. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines the outcome of the game, presents the game outcome to the player, and may dispense an award of some type depending on the outcome of the game. The operations described above may be carried out on the gaming machine when the gaming machine is operating as a "stand alone" unit and/or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

SUMMARY OF THE INVENTION

Broadly speaking, the invention relates to processing input for computing systems. More particularly, the invention relates to input systems and input processing techniques for serving multiple users via a common input surface (input area) or input device. In accordance with one aspect of the invention, two separate input detection systems can be provided. As a user-identifier mechanism, a first detection system can effectively detect the identity of a particular user who has provided input to a common input receiver made accessible to multiple users (e.g., e.g., a common input device, location, area, surface) made accessible to multiple users. In other words, the user-identifier mechanism can be effectively used to determine which one of the users has provided (e.g., entered input by touching the surface of a touchscreen).

However, it will be appreciated that the first detection system (or user-identifier mechanism system) need not be configured to detect the location of the touch on the common input receiver. As an input-locator mechanism, the second input detection system can detect the location of input by anyone of the users but need not be configured to identify the user who has provided the input at that location. It will be appreciated that the input-location system can include a touchscreen or multi-touch screen configured to detect single or multiple touches on its surface. The first and second input systems can be configured to communicate with a synchronizer/controller system and provide it with the identity of the user and location of the touch. It will be appreciated that the synchronizer/controller can be configured to effectively reconcile the information received from the two systems in order to determine whether it is likely that the particular player identified by the first system (user-identifier system) has provided input at the location indicated by the second system (input-location) system. This likelihood can, for example, be determined at least partially based on the timing information provided by the two systems (e.g., whether the times indicated by the two systems are within an acceptable range), whether multiple users have been identified within a determined period of time, and/or whether the same user has been detected to provide input to the same location for a determined period of time. It will also be appreciated that input entered by a non-user can be effectively ignored. In addition, a constant touch on the same location and/or multiple touches by the same user at the same location can be detected and processed accordingly.

In one embodiment, a user-identifier system is provided as a Radio Frequency (RF) system that can effectively detect a change in RF energy received by a RF receiver provided in the proximity of a user when the user touches a touchscreen. In other words, a RF receiver can be provided for each one of the multiple users to detect a change in the RF energy of anyone of the users. Each of the RF receivers can be positioned in the proximity of a user to detect a change in the RF energy when the user touches the touchscreen. The RF receivers can be tuned to the same frequency of RF transmitted by an RF generator. As such, it will be appreciated that there is no need to designate a different RF frequency to different users or use multiple RF generators. The touch-identifier system can include an APR (Acoustic Pulse Recognition) or capacitive touchscreen (or multi-touch screen). It will also be appreciated that the RF generator can be integrated with the APR or capacitive touchscreen (e.g., the RF generator can be provided as a conductive layer integrated with an APR touchscreen).

The invention can be implemented in numerous ways, including a method, an apparatus, a computer readable medium, a computing device, or a signal embodied in a carrier wave. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
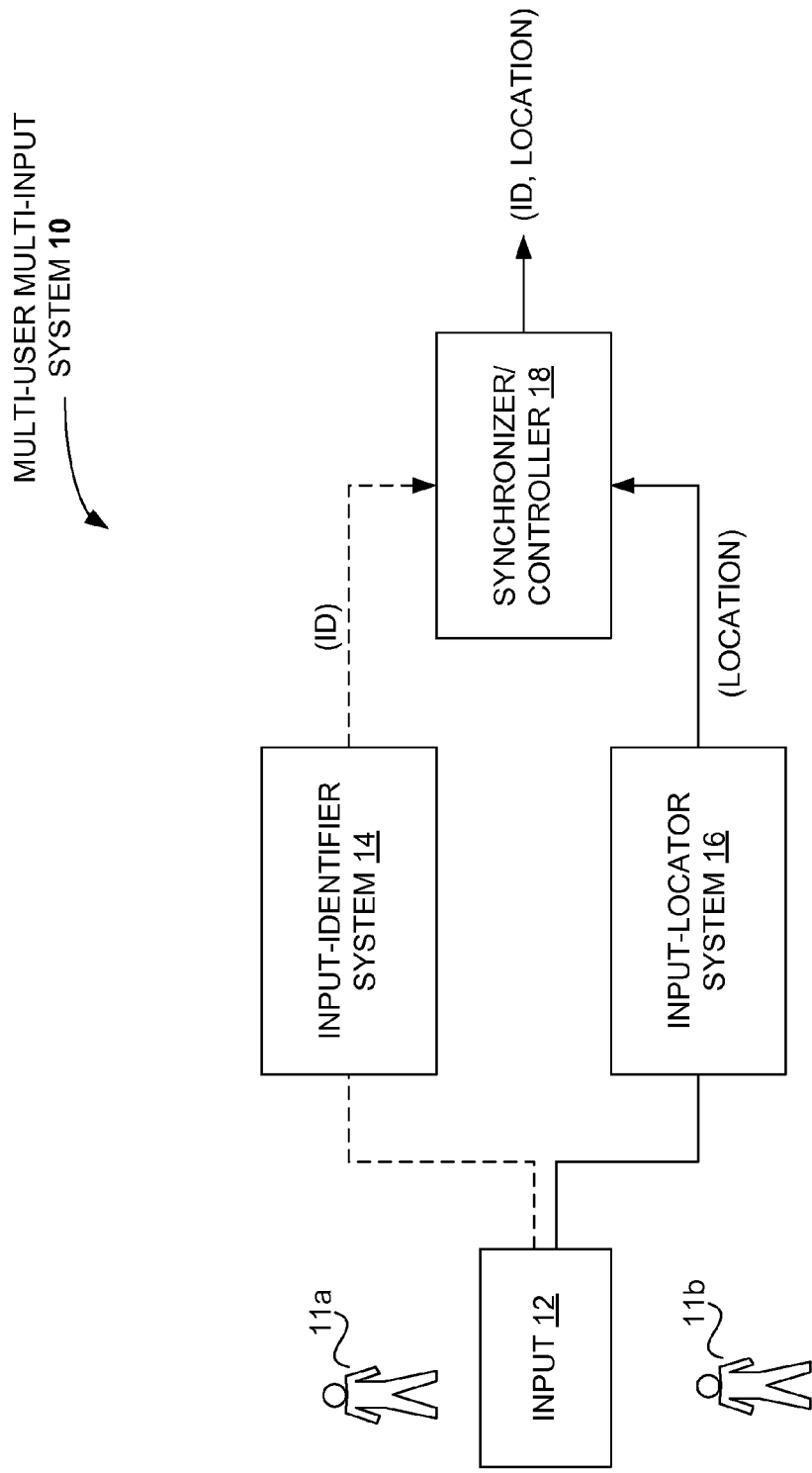
FIG. 1A depicts a multi-user multi-input system in accordance with one embodiment of the invention.

As noted in the background section, an input device can serve as an interface between a user (e.g., human being, application program) and a machine. The input device's primary functions include receiving input from the user and translating it for the machine. The input can be provided to a computing system in connection with a computer program code that is being executed by the computing system. More particularly, when an instance of computer program code (or execution instance) is being executed, input received via the input device is provided for processing to the execution instance. The input can, for example, be provided (e.g., entered) by a human being.

Techniques for processing input have become even more important for modern gaming environments. A conventional multi-touch screen can detect multiple touches at the same time. However, a conventional multi-touch screen cannot be shared as an input device between multiple users in a manner that a touch can be associated with a particular user. In other words, a conventional multi-touch screen cannot determine which user has touched the screen. Accordingly, improved techniques for providing an input system for multiple users are needed.

Broadly speaking, the invention pertains to input systems and input processing techniques for serving multiple users via a common input surface (input area) or input device. In accordance with one aspect of the invention, two separate input detection systems can be provided. As a user-identifier mechanism, a first detection system can effectively detect the identity of a particular user who has provided input to a common input receiver made accessible to multiple users (e.g., e.g., a common input device, location, area, surface) made accessible to multiple users. In other words, the user-identifier mechanism can be effectively used to determine which one of the users has provided (e.g., entered input by touching the surface of a touchscreen).

However, it will be appreciated that the first detection system (or user-identifier mechanism system) need not be configured to detect the location of the touch on the common input receiver. As an input-locator mechanism, the second input detection system can detect the location of input by anyone of the users but need not be configured to identify the user who has provided the input at that location. It will be appreciated that the input-location system can include a touchscreen or multi-touch screen configured to detect single or multiple touches on its surface. The first and second input systems can be configured to communicate with a synchronizer/controller system and provide it with the identity of the user and location of the touch. It will be appreciated that the synchronizer/controller can be configured to effectively reconcile the information received from the two systems in order to determine whether it is likely that the particular player identified by the first system (user-identifier system) has provided input at the location indicated by the second system (input-location) system. This likelihood can, for example, be determined at least partially based on the timing information provided by the two systems (e.g., whether the times indicated by the two systems are within an acceptable range), whether multiple users have been identified within a determined period of time, and/or whether the same user has been detected to provide input to the same location for a determined period of time. It will also be appreciated that input entered by a non-user can be effectively ignored. In addition, a constant touch on the same location and/or multiple touches by the same user at the same location can be detected and processed accordingly.

In one embodiment, a user-identifier system is provided as a Radio Frequency (RF) system that can effectively detect a change in RF energy received by a RF receiver provided in the proximity of a user when the user touches a touchscreen. In other words, a RF receiver can be provided for each one of the multiple users to detect a change in the RF energy of anyone of the users. Each of the RF receivers can be positioned in the proximity of a user to detect a change in the RF energy when the user touches the touchscreen. The RF receivers can be tuned to the same frequency of RF transmitted by an RF generator. As such, it will be appreciated that there is no need to designate a different RF frequency to different users or use multiple RF generators. The touch-identifier system can include an APR (Acoustic Pulse Recognition) or capacitive touchscreen (or multi-touch screen). It will also be appreciated that the RF generator can be integrated with the APR or capacitive touchscreen (e.g., the RF generator can be provided as a conductive layer integrated with an APR touchscreen).

Embodiments of these aspects of the invention are discussed below with reference to FIGS. 1A-16. However, those skilled in the art will readily appreciate that the detailed description given herein with respect to these figures is for explanatory purposes as the invention extends beyond these limited embodiments.

FIG. 1A depicts a multi-user multi-input system 10 in accordance with one embodiment of the invention. It will be appreciated that the multi-user multi-input system 10 can be provided as an input system (or device) for a plurality of users 11. Typically, the users 11 are capable of providing input by touching an input portion 12 (e.g., top surface) of the multi-user multi-input system 10. In order to detect input provided by a particular user (e.g., user 11a), two separate detection systems are provided by the multi-user multi-input system 10. Conceptually, the two detection systems are presented in FIG. 1A as a user-identifier system 14 and an input-locator system 16. The user-identifier system 14 can effectively identify the source (or origin) of the input. On the other hand, the input-locator system 16 can effectively determine the location of the input. It will be appreciated that these two systems can effectively operate independently and/or as two separate detection systems (or mechanisms). More particularly, the user-identifier system 14 can detect which one of the users 11 has provided input to the input portion 12 of the multi-user multi-input system 10. In other words, the user-identifier system 14 can effectively identify a particular user when the user provides input to the input portion 12. As such, the user-identifier system 14 can effectively indicate that one or more of the users 11 have provided input. However, the user-identifier system 14 needs not be configured to determine the location of the input provided by the identified user. The location of the input determined by the input-locator system 16 which can provide the location of a touch when it independently detects that input has been provided. As such the input-locator system 16 can provide an indication of the particular location of the input.

Referring to FIG. 1A, the user-identifier system 14 and input-locator system 16 can provide the information associated with the source and location of the input to a synchronizer/controller 18. This information can include an identification (ID) that can be used to effectively identify the users 11 and a location (L) that indicates the location of input provided in the input portion 12. It will be appreciated that the synchronizer/controller 18 can effectively determine whether to register and/or report that the user identified by the user-identifier system 14 has provided input at the location indicated by the input-locator system 16. In effect, the synchronizer/controller 18 can reconcile information provided by the user-identifier system 14 and input-locator system 16 in an effort to determine whether input should be assigned to a particular one of the users 11 at a particular location on the input portion 12. As will be discussed below, the synchronizer/controller 18 can consider various information including the timing information and the sequence of input provided by the user-identifier system 14 and input-locator system 16. The synchronizer/controller 18 can, for example, consider one or more of the following: timing information, whether multiple users have been identified within a determined period of time, whether multiple input has been detected within a determined amount of time at the same location and/or the same user has been identified within a determined amount of time.

Figure 1B:
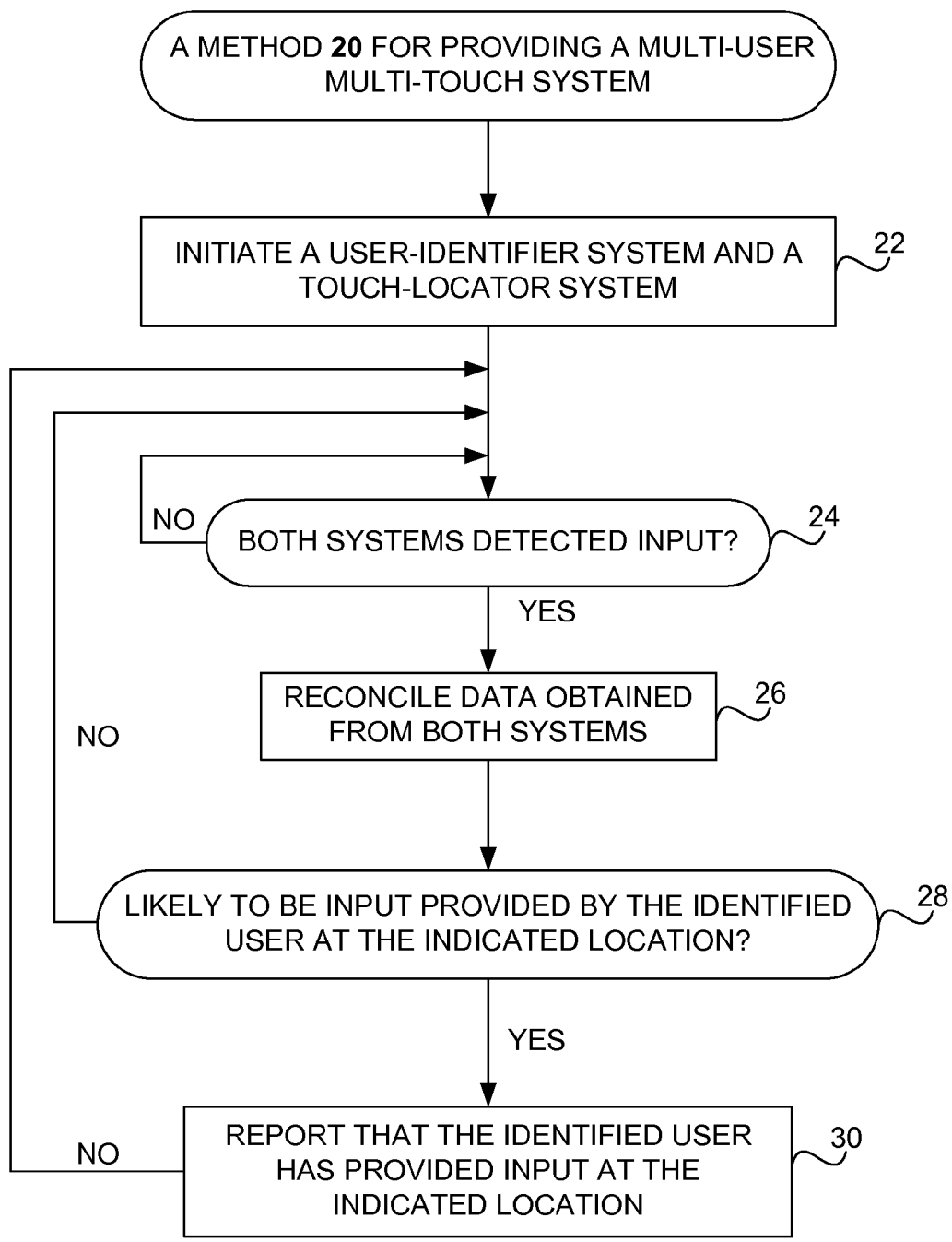
FIG. 1B depicts a method for providing a multi-user multi-input system in accordance with one embodiment of the invention.

FIG. 1B depicts a method 20 for providing a multi-user multi-input system in accordance with one embodiment of the invention. Initially, an input-identification system and an input-locator system are both initiated (22). The input-identification system can effectively determine which particular has provided input to the multi-user multi-input system. The input-locator system can determine the location where of input that could be provided by any one of the users. After both of the input-indication and input-locator systems have been initiated (22), it is determined (24) whether both of the input-identification and input-locator systems have detected input. In effect, the method 20 can wait until both of the input-identification and input-locator systems detect input (e.g., a touch on a touchscreen). If input has been detected by both of the input-identification and input-locator systems, information (or data) pertaining to the input is obtained from both of the input-identification and input-locator systems in an effort to reconcile and determine (28) whether it is likely that the identified user has been provided input in the indicated location. As noted above, the determining (28) can, for example, be made based on timing information and/or the sequence of input received from the input-identification and input-locator systems. Accordingly, if it is determined (28) that the user identified by the input-identification system has provided input at the location indicated by the input-locator system, the identified user is reported (30) to have provided an input at the indicated location. After the input has been reported (30), the method 20 proceeds to determine (24) whether both of the input-identification and input-locator systems have detected input. Thereafter, the method 20 can proceed in a similar manner as described above. It should be noted that if it is determined (28) that identified user is not likely to have provided the input at the indicated location, the method 20 proceeds directly to determine (24) whether both of the input-identification and input-locator systems have detected input. In effect, if the data obtained from both of the input-identification and input-locator systems cannot be reconciled, the data is effectively ignored and no input is reported. It will be appreciated that input can, for example, be provided by touching a touchscreen.

Figure 1C:
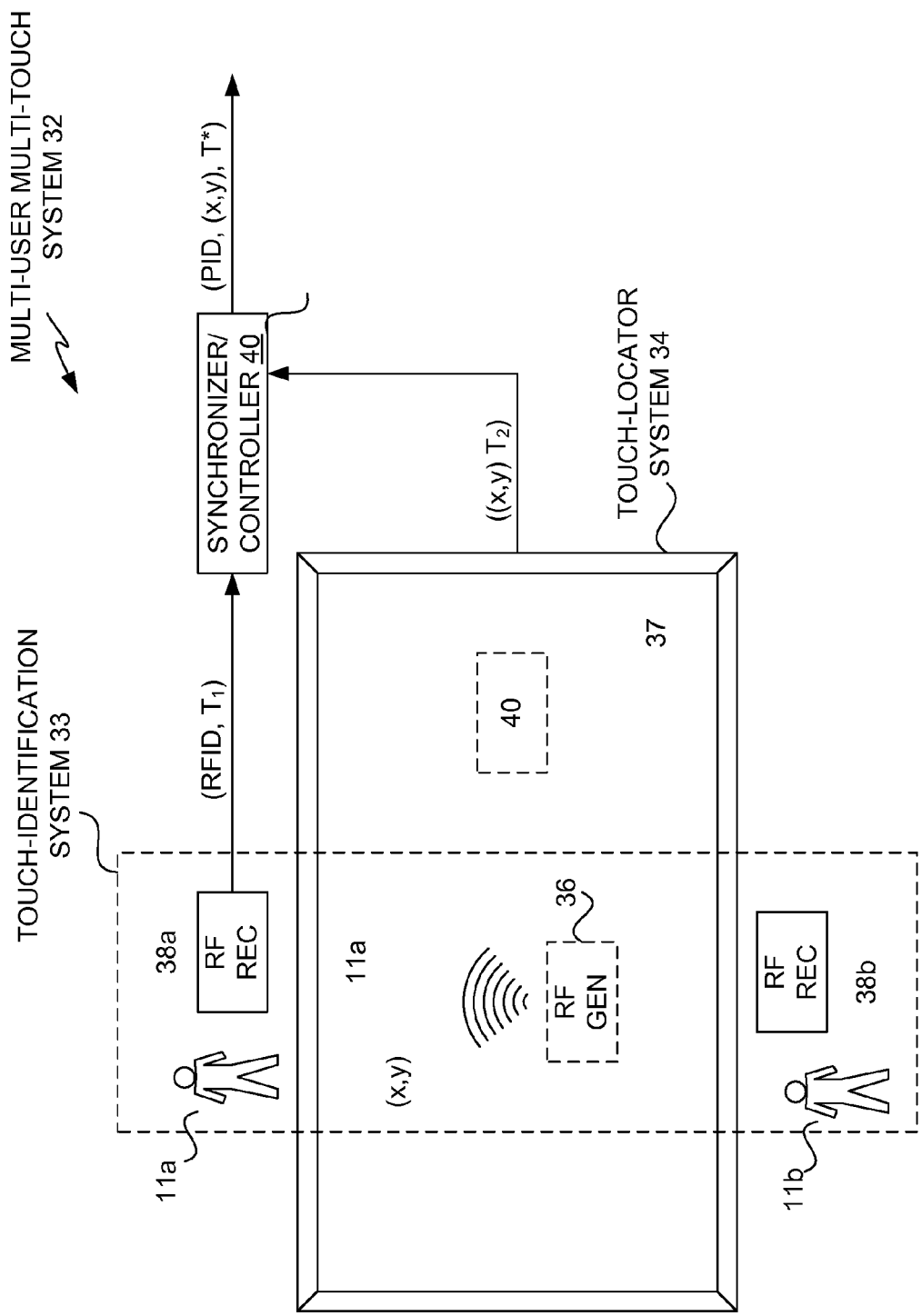
FIG. 1C depicts a multi-user multi-input system in accordance with one embodiment of the invention.

To further elaborate, FIG. 1C depicts a multi-user multi-input system 32 in accordance with one embodiment of the invention. Referring to FIG. 1C, the multi-user multi-input system 32 can effectively include a touch-identifier system 33 and a touch-locator system 34. The touch-identifier system 33 uses a radio frequency (RF) detection mechanism to effectively identify a particular one of the users 11 when the user touches a touch surface 37. More particularly, the touch-identifier system 33 provides a Radio Frequency (RF) generator 36 that emits radio frequency waves (or energy). The RF energy can be detected by an RF receivers 38 provided for each of the users 11. It will be appreciated that the RF receivers 38 can be provided in the proximity of users 11 in a manner that allows each of the receivers 38 to detect the change in the RF energy when a particular one of the users 11 touches the input surface 37 of a touchscreen which is effectively provided by the touch-locator system 34. By way of example, when the user 11a touches the input surface 37 of the touchscreen, the RF receiver 38a which is in the proximity of the user 11a detects a change in RF energy emitted by the RF generator 36. When the RF receiver 38a detects the change in RF energy, it can send an indication to a synchronizer/controller 40. This indication can effectively identify the RF receiver by, for example, an RF identifier assigned to the RF receiver 38a and also provide a time when the change in the RF energy was detected. As counterpart to the touch-identification system 33, the touch-locator system 34 detects a touch at the location (x,y) when the user 11a touches the input surface 37. It should be noted that the touch-locator system 34 need not be configured to identify the user 11a as the user who has touched the input surface 37. It will be appreciated that the touch-locator system 34 can be configured just to detect the location of a touch in a similar manner as a conventional touchscreen (e.g., an acoustic or capacitive touchscreen). When the touch-locator system 34 detects a touch at the location (x,y), it reports the location and the time when the touch was detected to the synchronizer/controller 40.

It will be appreciated that conventional touchscreen can be integrated into the multi-user multi-input system 32 and used to effectively detect the touch at a particular location. As such, the touch-locator system 34 can, for example, include an APR or capacitance touchscreen that uses conventional techniques to detect a touch at a particular location (e.g., a touch at the location (x,y)). Furthermore, the synchronizer/controller 40 can be effectively integrated with an APR or capacitance touchscreen (e.g., the synchronizer/controller 40 can be integrated with a touchscreen controller). As such, the synchronizer/controller 40 is also depicted with dashed lines in FIG. 1C. It should be noted that the users 11 can be registered with the synchronizer/controller 40. In other words, information pertaining to the users 11 can be stored and/or obtained by the synchronizer/controller 40 to effectively identify a particular user (e.g., user 11a) by its association with a particular RF receiver 38. By way of example, user 11a may initially register with the synchronizer/controller 40 and provide the information needed to effectively identify the user 11a for various purposes and applications. In gaming environments, user identification can, for example, be provided by user tracking systems to effectively identify the user 11a. Further, various monitoring mechanisms can be used to monitor the use of the Multi-user Multi-touch system 32. These techniques can, for example, include human observer (e.g., dealers) or cameras that monitor the activities of the users 11 to ensure that RF receivers 38 are appropriately used. It will be appreciated that the RF receivers 38 can be tuned to the same frequency used by the RF generator 36.

Figure 1D:
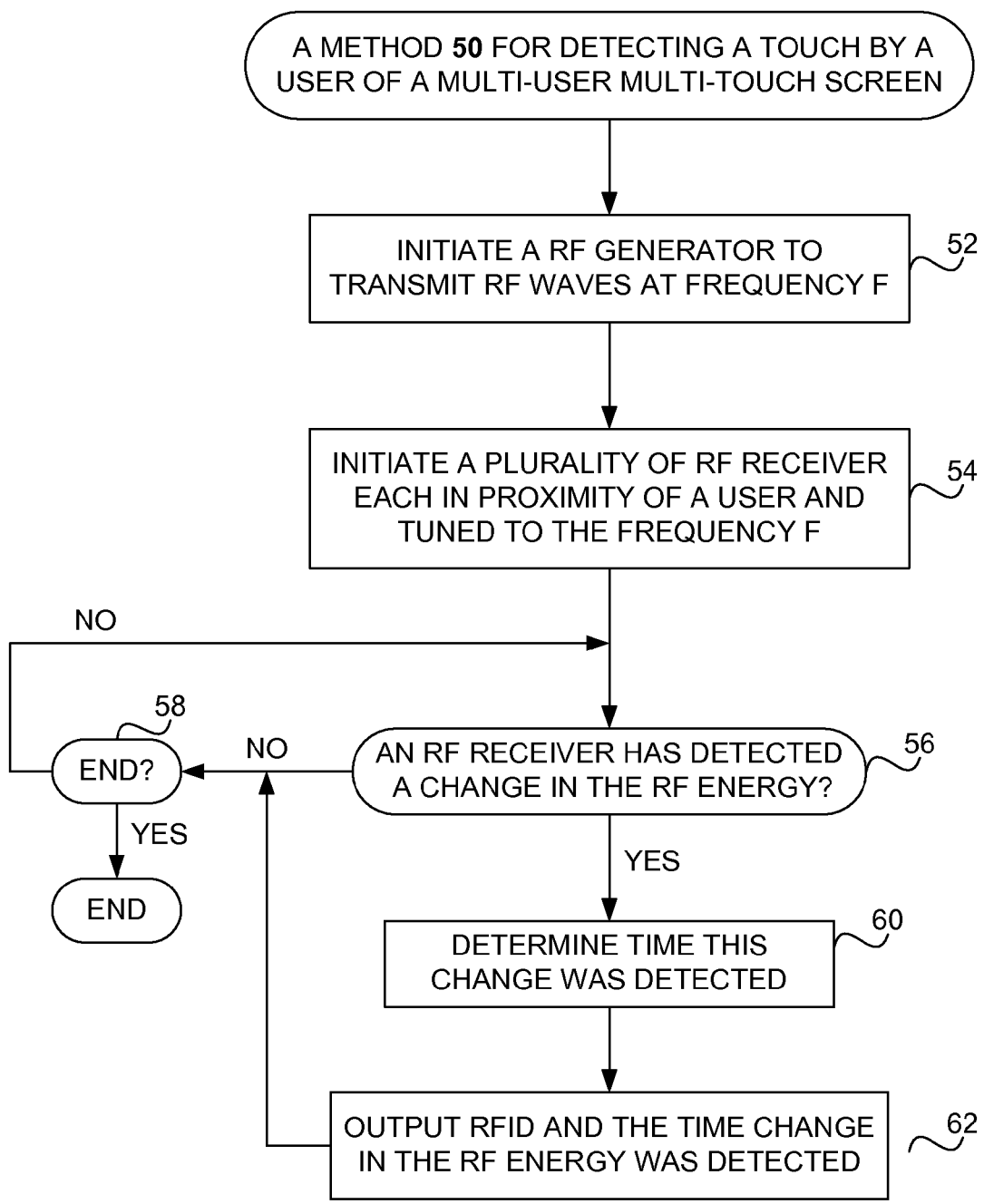
FIG. 1D depicts a method for detecting a touch by a user of the multi-user multi-input screen in accordance with one embodiment of the invention.

To further elaborate, FIG. 1D depicts a method 50 for detecting a touch by a user of the multi-user multi-input screen in accordance with one embodiment of the invention. The method 50 can, for example, be performed by the touch-identifier system 33 depicted in FIG. 1C. Referring now to FIG. 1D, initially, an RF generator is initiated (52) to transmit RF waves at a frequency F. In addition, a plurality of RF receivers are initiated (54) so that each user has an assigned RF receiver typically suited in proximity of the user. It should be noted that each of the RF receivers is tuned to the same frequency, namely, the frequency F used by the RF generator. After the RF generator and receivers are initiated, it is determined (56) whether an RF receiver has detected the change in the RF energy it receives from the RF generator. In effect, the method 50 can wait for an RF receiver to detect a change in the RF energy unless it is determined (58) to end the method 50 or effectively end determining a touch. If it is determined (56) that an RF receiver has detected a change in the RF energy, the time when the change was detected is determined and/or obtained (60). Accordingly, the identifier of the RF receiver (RF ID) which has detected the change in the RF energy is output (62) with the time when the change in the RF energy was detected. Thereafter the method 50 can proceed to determine whether to end detecting a touch (58). If it is determined (58) not to end the method 50, the method 50 can proceed to determine (56) whether an RF receiver has detected a change in RF energy. That determination (58) can, for example, be made based on the input provided by an administrator (e.g., receiving a shutdown command) and/or timing considerations (e.g., shutting down based on a timer). In any case, the method 50 ends when it is determined (58) to end detecting a touch. It should be noted that the output provided by the method 50 can, for example, be received as input by a synchronizer/controller 40 depicted in FIG. 1C.

Figure 1E:
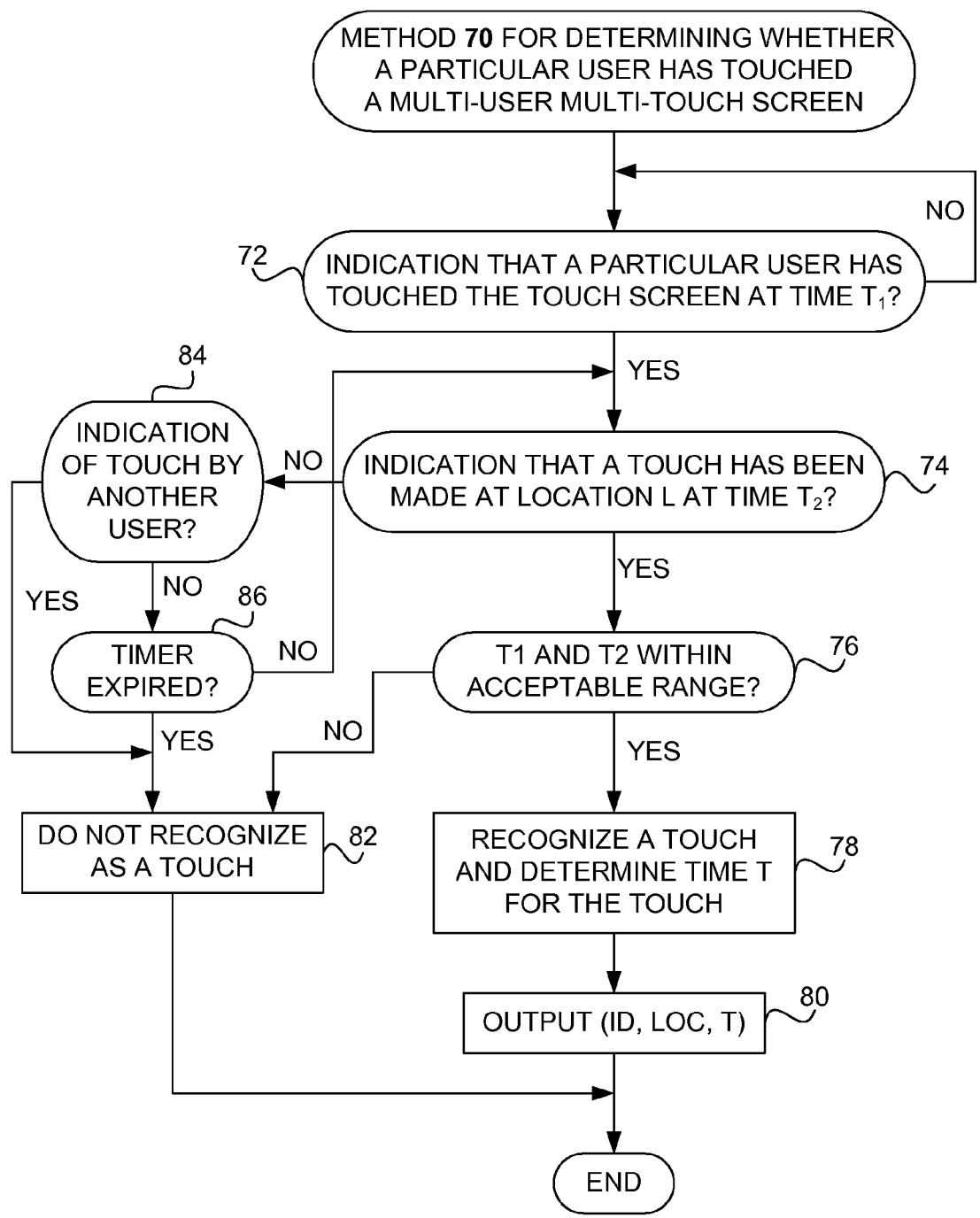
FIG. 1E depicts a method for determining whether a particular user has touched a multi-user multi-touch screen in accordance with one embodiment of the invention.

FIG. 1E depicts a method 70 for determining whether a particular user has touched a multi-user multi-touch screen in accordance with one embodiment of the invention. Method 70 can, for example, be used by the synchronizer/controller 40 depicted in FIG. 1C. Initially, it is determined (72) whether an indication has been received that indicates that a particular user has touched the touchscreen at a time T1. Typically, the indication is received from a touch-identifier system such as the touch-identifier system 33 depicted in FIG. 1C. In effect, the method 70 can wait for an indication that a particular user has touched the screen. If it is determined (72) that an indication has been received that indicates that a particular user has touched the touchscreen at time T1, it is determined (74) whether a separate indication has been received that the touchscreen has been touched at a location L at time $T_2$. It should be noted that this indication is a separate indication from the indication that a particular user has touched the touchscreen (72) and times $T_1$ and $T_2$ may differ so that time $T_1$ may indicate a time before or after time $T_2$. Typically, a touch-locator system (e.g., touch-locator system 33) sends the indication that the touchscreen has been touched at a particular location and a particular time. In effect, the method 70 can wait for an indication that indicates that a touch has been made (74) after it receives the indication that a particular user has touched the screen. It should be noted that an indication that a user has touched the screen at location L could be received prior to the indication that a particular user has touched the screen. Generally, the indications can be stored. Further, it is possible to have two separate processes listen for the indications. However, for the sake of simplicity, FIG. 1E depicts a simplified method 70. In any case, if both indications are present, it is determined (76) whether the time indicated ($T_1$ and $T_2$) are within an acceptable range. As such, if it is determined (76) that the times $T_1$ and $T_2$ are within the acceptable range, a touch is effectively recognized to have been made by the identified user identified at the indicated location. In addition, a time T for the touch can be determined (72). Time T can, for example, be determined by taking an average of the two times $T_1$ and $T_2$, or selecting one which is deemed more reliable, and so on. Accordingly, the identification of the user (ID), the location of the touch (L), and the determined time (T) can be output (80) before the method 70 ends. However, it should be noted that if it is determined (76) that the times T1 and T2 are not within the acceptable range, the touch is not recognized and no output indicating the touch is provided (82). Also, if it is determined (74) that an indication of a touch at a particular location has not been received, it is determined (84) whether an indication of the touch by another user has been received (i.e., a different user than the user identified by the first indication. If it is determined (84) that an indication of touch by another user is received, no touch is effectively recognized (82) and the method 70 ends. On another hand, if it is determined that an indication of a touch by another user has not been received (84), the method 70 can effectively wait until a timer expires (86) to receive an indication of a touch made at location L at a time T2 (74). If it is determined (86) that the timer has expired, no touch is effectively recognized and the method 70 ends. It should be noted that the determination (84) can be implemented to also effectively ignore subsequent touches by the same user if the subsequent touch is within a determined range.

Figure 1F:
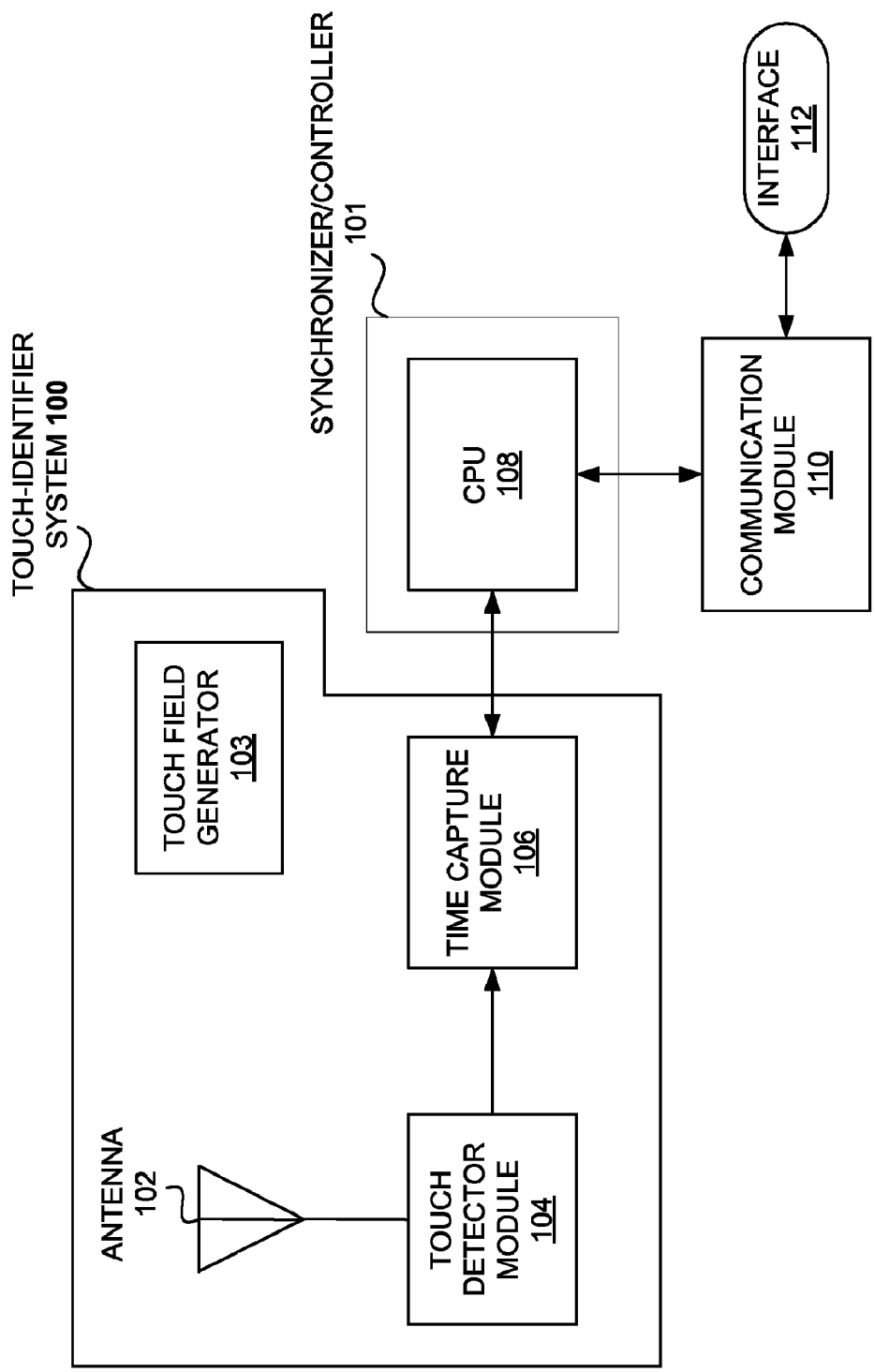
FIG. 1F depicts a touch-identifier system in accordance with one embodiment of the invention.

FIG. 1F depicts a touch-identifier system 100 in accordance with one embodiment of the invention. The touch-identifier system 100 is configured to detect a touch by a particular user of a multi-user touchscreen and provide an indication to a synchronizer/controller 101. The synchronizer/controller 101 uses one or more processors 108 for processing and can also communicate via a communication module 110 to an interface 122 that can, for example, support one or more application programs (e.g., gaming application programs). Referring to FIG. 1F, the touch-identifier system 100 includes an antenna 102 that is tuned to the RF frequency of a RF generator (or touch field generator) 105 that generates an RF field at a particular frequency F (e.g., 433.92 MHz). In addition, the touch-identifier system 100 includes touch detector module (or component) 104 and touch capture module or component) 106. The touch detector module 104 can detect a touch by a particular user (e.g., a player) on the multi-user touchscreen. The time capture Module 106 can capture the time when the touch by the player had been detected. By of example, the system time can be captured and reported to the synchronizer/controller 108. The synchronizer/controller 108 can then report to the interface 112 that a touch by a particular player associated with the touch detector module 104 has been detected at the time provided by the time capture module. This communication can be made via the communication 110 using various techniques, for example, by using RS232, USB, RS485, serial, parallel, or Ethernet protocols, or any combination thereof.

Figure 2:
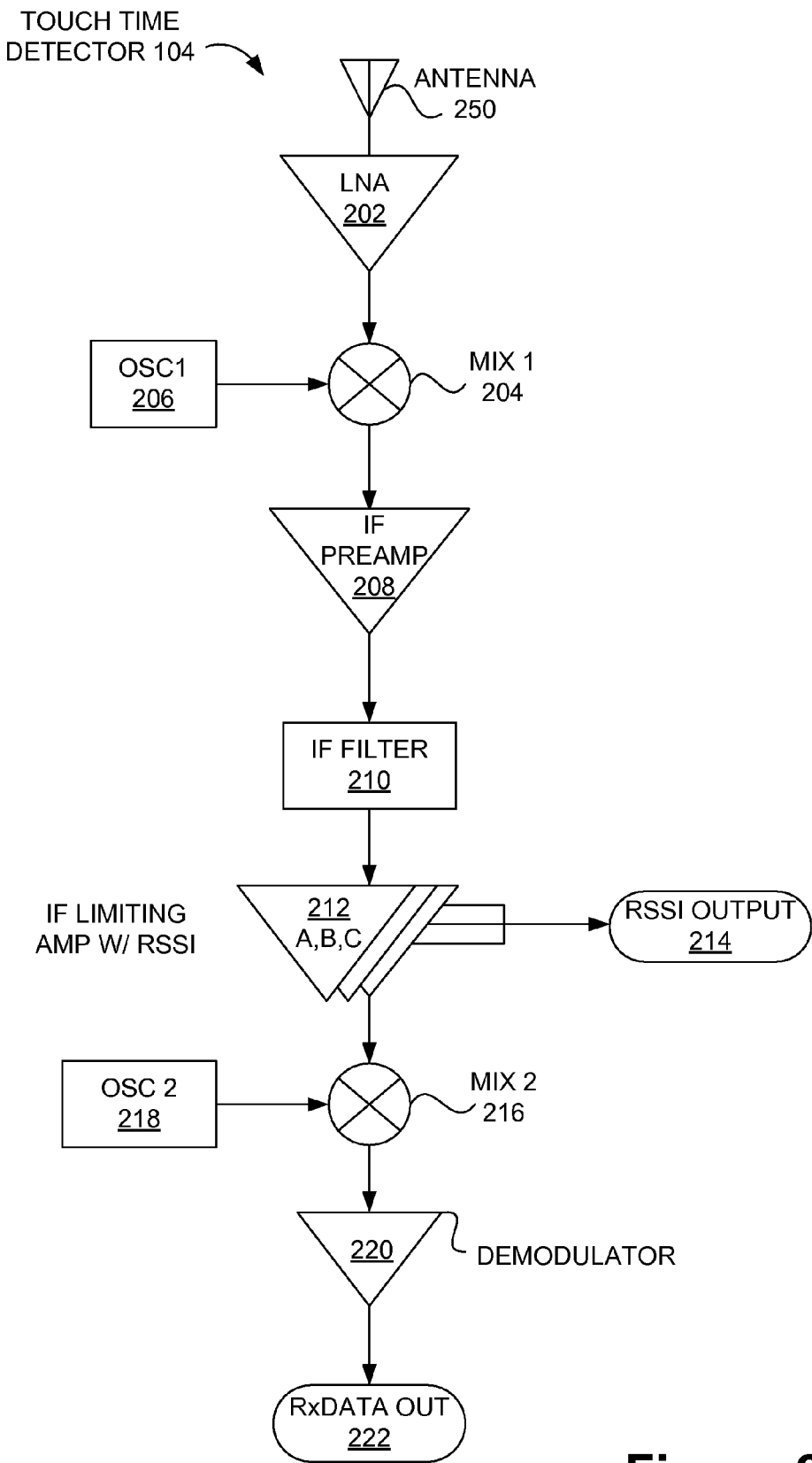
FIG. 2 depicts in greater detail a touch time detector in accordance with one embodiment of the invention.

FIG. 2 depicts in greater detail a touch time detector 104 (also shown in FIG. 1E) in accordance with one embodiment of the invention. Referring to FIG. 2, an Antenna 250 can receive a RF signal from a RF generator. The signal can be amplified by the Low Noise Amplifier (LNA) 202 is coupled to one of the input ports of a two input port mixer (MIX1) 204. The other input port of the two input port mixer MIX1 204 can receive a sign wave supplied by local an oscillator (OSC1) 206. The output port of MIX1 204 is connected to a first IF PREAMP 208. Those skilled in the art will appreciate that the first IF PREAMP 208 can amplify the mixer signal of the original OSC1, received signal, and the sum of their differences. Referring to FIG. 2, the output of the IF PREAMP 208 is connected to the IF FILTER 210. The IF FILTER 210 can eliminate the OSC1 206, received signal, and their sum. The output of the IF FILTER 210 is input into at lease three IF LIMITING AMP W/RSSI 212 A, B, and C. These IF LIMITING AMP W/RSSI 212 A, B, and C supply an output labeled as RSSI OUTPUT 214. The RSSI OUTPUT 214 represents the received signal strength of the signal received by the antenna 250. Typically, the RSSI signal is proportional to the log of the signal at the IF LIMITING AMP'S 212 A, B, and C. The range can, for example, be about 0.040 mV to 160 mV. The slope of the RSSI Output 214 can, for example, be about 26 mV/dB of the RF signal. The output of the IF LIMITING AMP 212 C is connected to one of the inputs of MIX2 216. The other input to MIX2 216 comes from OSC2 218. Accordingly, these two signals can be mixed together in MIX2 216 and the output of MIX2 216 can go into the demoduator 220 which output s the RxDATA OUT 222.

Figure 3:
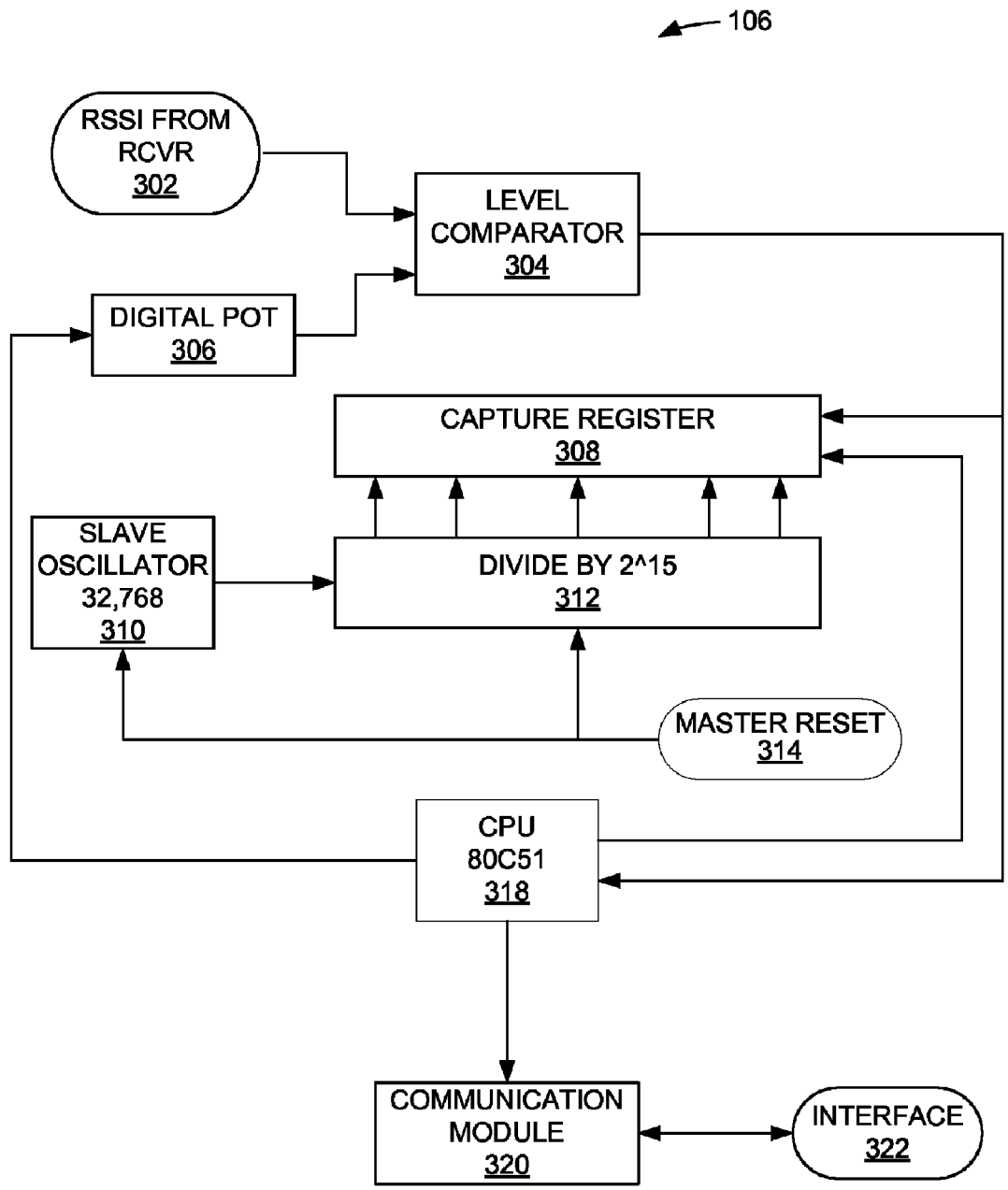
FIG. 3 is a schematic block diagram of a Time Capture Module circuitry in accordance with one embodiment of the invention.

FIG. 3 is a schematic block diagram of a Time Capture Module 106 circuitry in accordance with one embodiment of the invention. It should be noted that the RSSI OUTPUT 214 (shown in FIG. 2) can be connected to the RSSI FROM RCVR 302. Referring to FIG. 3, the output of the block 302 is connected to one input of a level comparator 304. The other input to the level comparator 304 is the output of a digital pot 306. The output of the level comparator 304 can be used to capture the count in the capture register 308 and create an interrupt within a CPU 318. The capture register 308 mirrors the divider chain Divide by 2^15 (312). This divider chain Divides by 2^15 (312) supplied with a signal from the slave oscillator 310. The slave oscillator 310 and the Divide by 2^15 (312) can be reset by a signal supplied by the master reset 314. The CPU 318 can effectively provide the data in the capture register 308 to the communication module 318. The communication module 320 can communicate the data in the capture register 308 to the interface 322. The communication module 320 can be used to communicate the data in the Capture Register 308 and receive settings for the Digital Pot 306.

Figure 4:
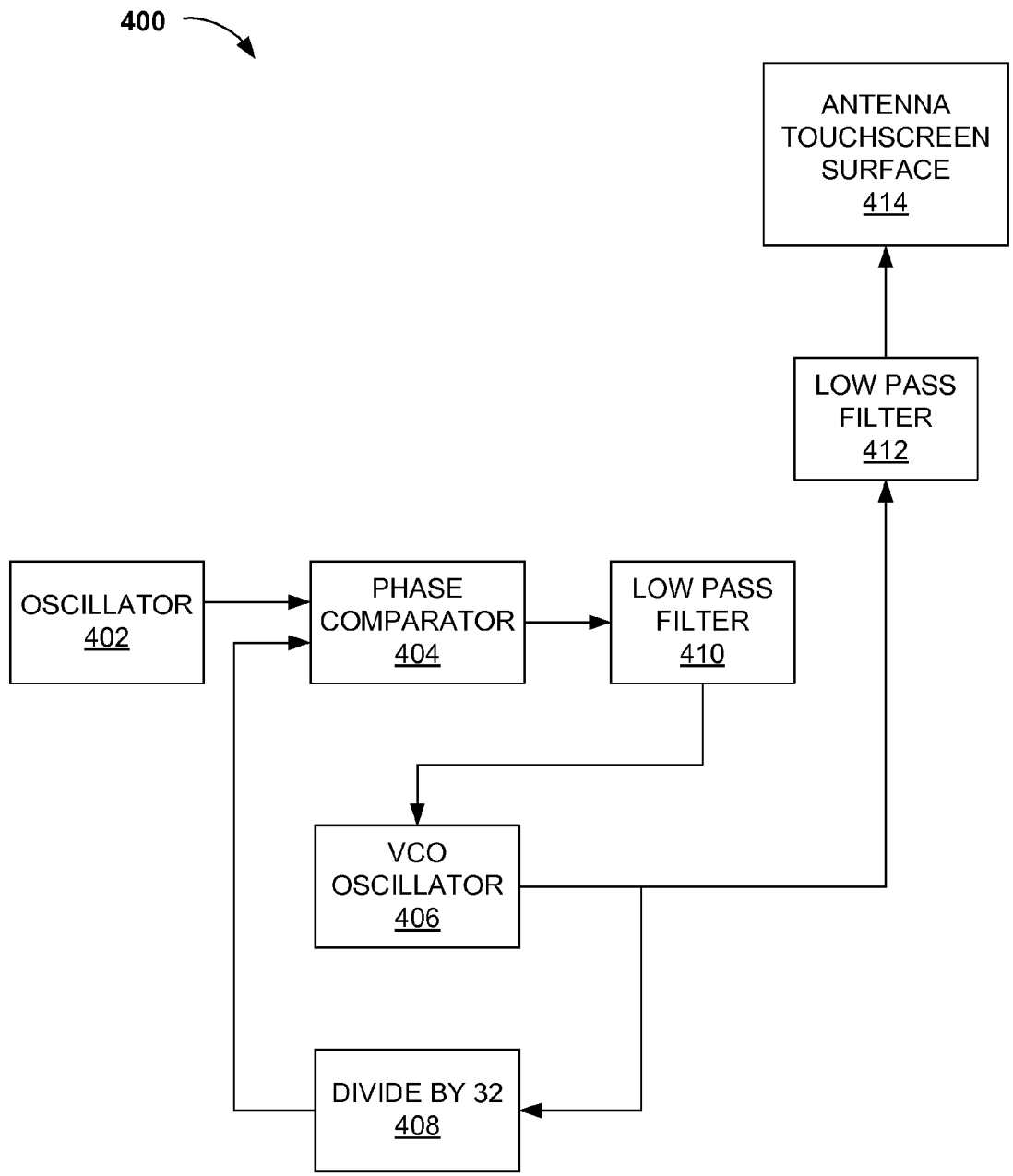
FIG. 4 is a block diagram of a RF generator (or a touch field generator) in accordance with one embodiment of the invention.

FIG. 4 is a block diagram of a RF generator (or a touch field generator) 400 in accordance with one embodiment of the invention. It will be appreciated that the touch field generator 400 can, for example, generate an RF field around a multi-user touchscreen that serves as a common playing field (or common play field). Referring to FIG. 4, an oscillator 402 can generate a frequency that can, for example, be 1/32 of the operating frequency (e.g., 1/32 of 433.92 MHz, or 13.56 MHz). Those skilled in the art will readily appreciate that various frequencies can be used as the operating frequency or oscillator frequency. Referring back to FIG. 4, the signal from the oscillator 402 is connected to a phase comparator 404. The phase comparator 404 can compare the phase of the oscillator 402 to the phase of the signal coming from the Divide by 32 (408). Those skilled in the art will readily appreciate that various other divide can be used. Referring back to FIG. 4, the output of the phase comparator 404 is connected to a low pass filter 410 to remove any high frequencies. The DC value from the low pass filter 410 is connected to the input of a voltage controlled oscillator (VCO) 406. The controlled oscillator (VCO) 406 can produces an output frequency that is about 32 times the frequency of the oscillator 402. If the VCO 406 is low in frequency, the phase comparator 404 would produce a positive going spike that can be subsequently integrated by the low pass filter 410. As a result, a small positive voltage can be output by the low pass filter 410. This small positive voltage would cause the VCO 406 to increase in frequency. Consequently, the VCO 406 output would match the frequency of the Oscillator 402. On the other hand, if the VCO 406 is high in frequency, the phase comparator 404 would produce a negative going spike that can then be integrated by the Low Pass Filter 410 and a small negative voltage will be output by the Low Pass Filter 410. This small negative voltage would cause the VCO 406 to decrease in frequency and thus VCO 406 output will match the frequency of Oscillator 402. The output frequency of the VCO 406 can then be filtered by a Low Pass Filter 412 to remove the harmonic content and the signal can then be placed on the antenna touchscreen surface 414.

Figure 5A:
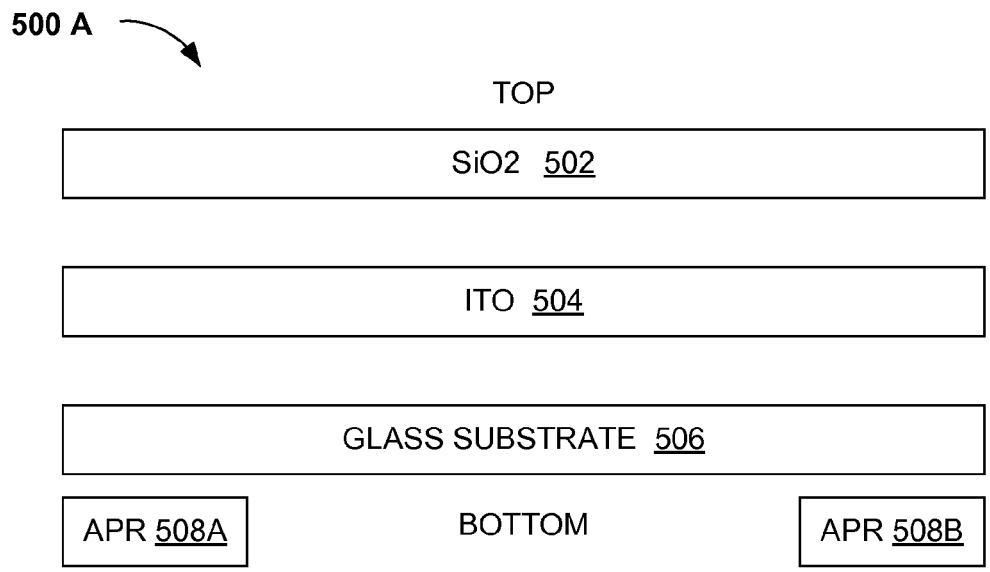
FIG. 5A depicts an antenna touchscreen surface that utilizes an Acoustic Pulse Recognition (APR) technology to detect a touch.
Figure 5B:
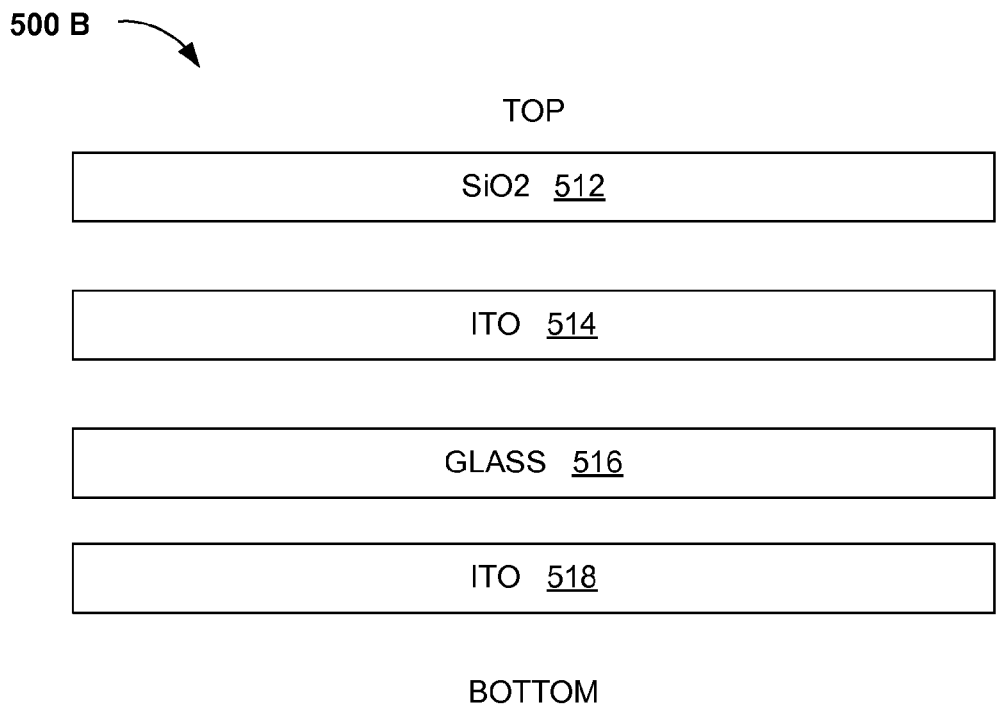
FIG. 5B depicts an antenna touchscreen surface that utilizes capacitance to detect a touch.

To further elaborate, FIGS. 5A-B depict side views/cross sections of the antenna touchscreen surface 414 (also shown in FIG. 4) in accordance with the embodiments of the invention. FIG. 5A depicts an antenna touchscreen surface 414 that utilizes an Acoustic Pulse Recognition (APR) technology to detect a touch. Referring to FIG. 5A, the top layer is provided as a silicon dioxide (SiO2) layer 502 which can serve as an insulating layer and a protection layer for the indium tin oxide (ITO) layer 504. Those skilled in the art will appreciate that the indium tin oxide (ITO) layer 504 can act as a conductive layer and as such be used to transmit a RF field. Referring again to FIG. 5A, the bottom layer is depicted as a glass substrate 506 layer. The glass substrate 506 layer can provide the structural strength for the antenna touchscreen surface 414. It should be noted that the APR 508A and B, (C and D not shown) represent the Acoustic Pulse Recognition (APR) transducers that can be mounted on the bottom of the touch-screen glass substrate 506.

FIG. 5B depicts an antenna touchscreen surface 414 that utilizes capacitance to detect a touch. Referring to FIG. 5B, a silicon dioxide SiO2 layer 512 is provided as an insulating layer and for protecting the indium tin oxide ITO 514 layer. The indium tin oxide ITO 514 is a conductive layer and as such can be used to both transmit the RF field and effectively serve as one plate of a capacitor for a capacitance touch-screen. The next layer is a Glass Substrate 516 layer. This layer provides the structural strength for the touchscreen. Optionally, an indium tin oxide ITO layer 518 can be added to serve as a conductive layer used as an electrical isolating element.

Figure 6A:
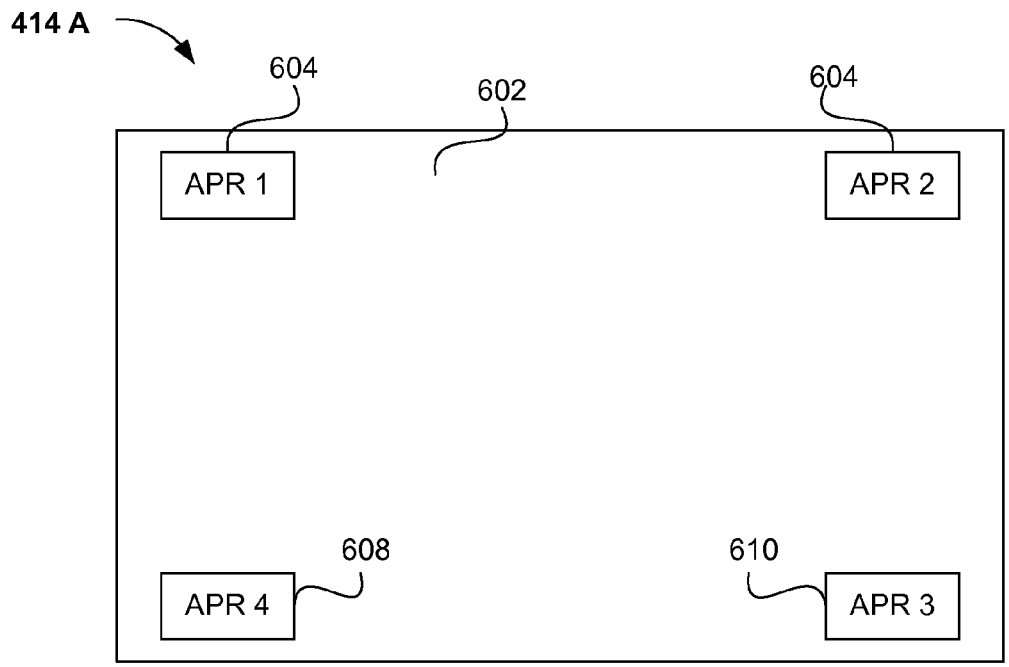
FIGS. 6A and 6B depict top views of the antenna touchscreen surface in accordance with the embodiments of the invention.
Figure 6B:
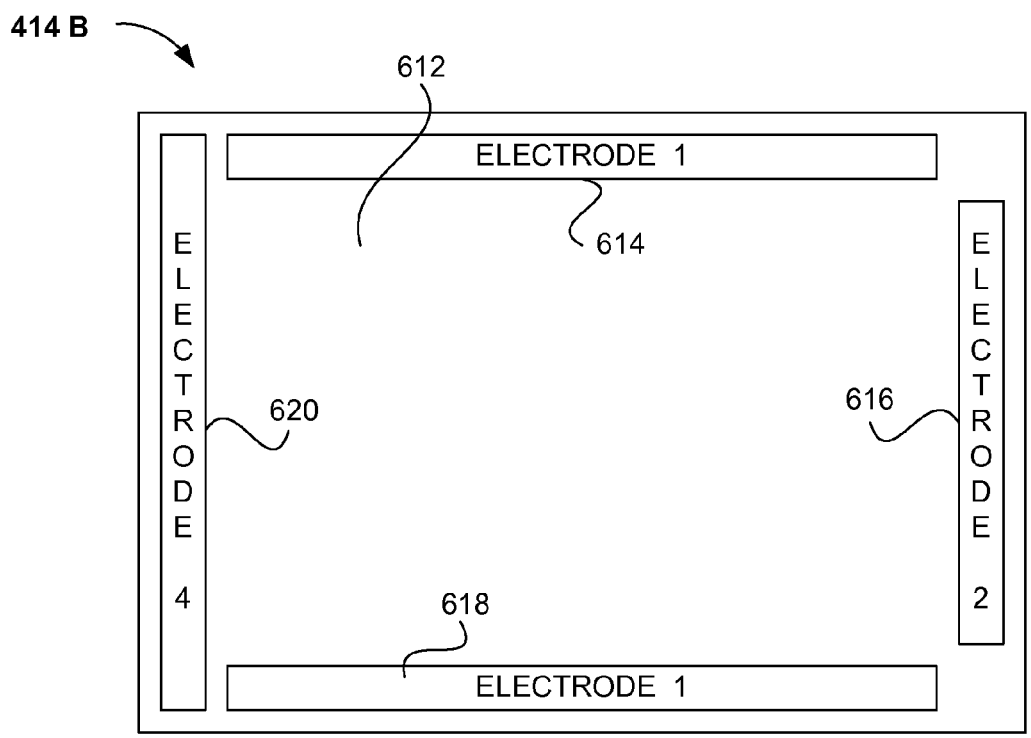

FIGS. 6A and 6B depict top views of the antenna touchscreen surface 414 (also shown in FIG. 4) in accordance with the embodiments of the invention. Referring to FIG. 6A, a top view 414A including a surface area 602 is depicted. The surface 602 can, for example, represent a common play field (or area) 602 provided over the top of a gaming apparatus display. The gaming apparatus display can, for example, be a LCD, CRT, plasma, or a rear projector display. The APR transducers 604, 606, 608, and 610 can be seen through the glass substrate 602. Referring now to FIG. 6B, a top view 414B through the top layer of silicon dioxide SiO2 612, indium tin oxide ITO 614, and glass substrate 602 is depicted. In top view 414B, electrodes 614, 616, 618, and 620 are depicted. It will be appreciated that the electrodes 614, 616, 618, and 620 can be printed on top or bottom of the indium tin oxide ITO 614 and be connected to the electronics to determine the touch positions as well as serving as an RF Field Generator.

Figure 7:
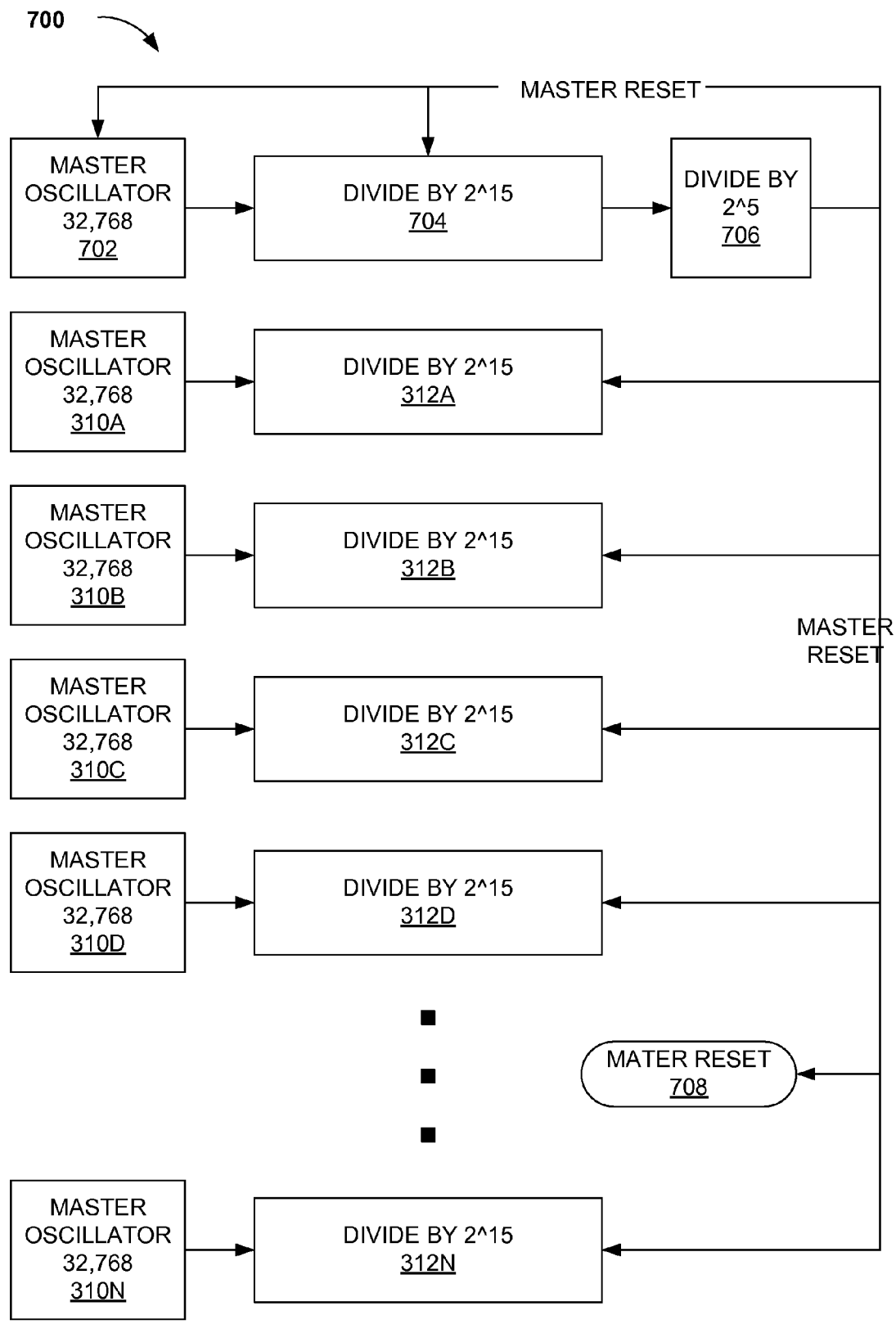
FIG. 7 depicts a method for synchronizing time capture clocks in accordance with one embodiment of the invention.

FIG. 7 depicts a method 700 for synchronizing time capture clocks in accordance with one embodiment of the invention. Referring to FIG. 7, a master oscillator 702 supplies a square wave pulse to the Divide by 2^15 (704). The output of the Divide by 2^15 (704) is the input into a Divide by 2^5 (706). The output of the Divide by 2^5 (706) becomes the master reset pulse resetting the master oscillator 702, Divide by 2^15 (704), Divide by 2^5 (706), all of the Slave Oscillators 310A, 310B, 310C, 310D-N, and all of the Divide by 2^15 (312A, 312B, 312C, 312D-N). The slave oscillator 310A and Divide by 2^15 (312A) represent one of the touch time detector module 100 associated with one of the positions on the table game. It should be noted that the slave oscillator 310B and Divide by 2^15 (312B) can represent another touch time detector module 100 which can, for example, be associated with another position on the same table game. This process can be performed for other touch time detector modules (e.g., for various positions on a gaming table).

Figure 8:
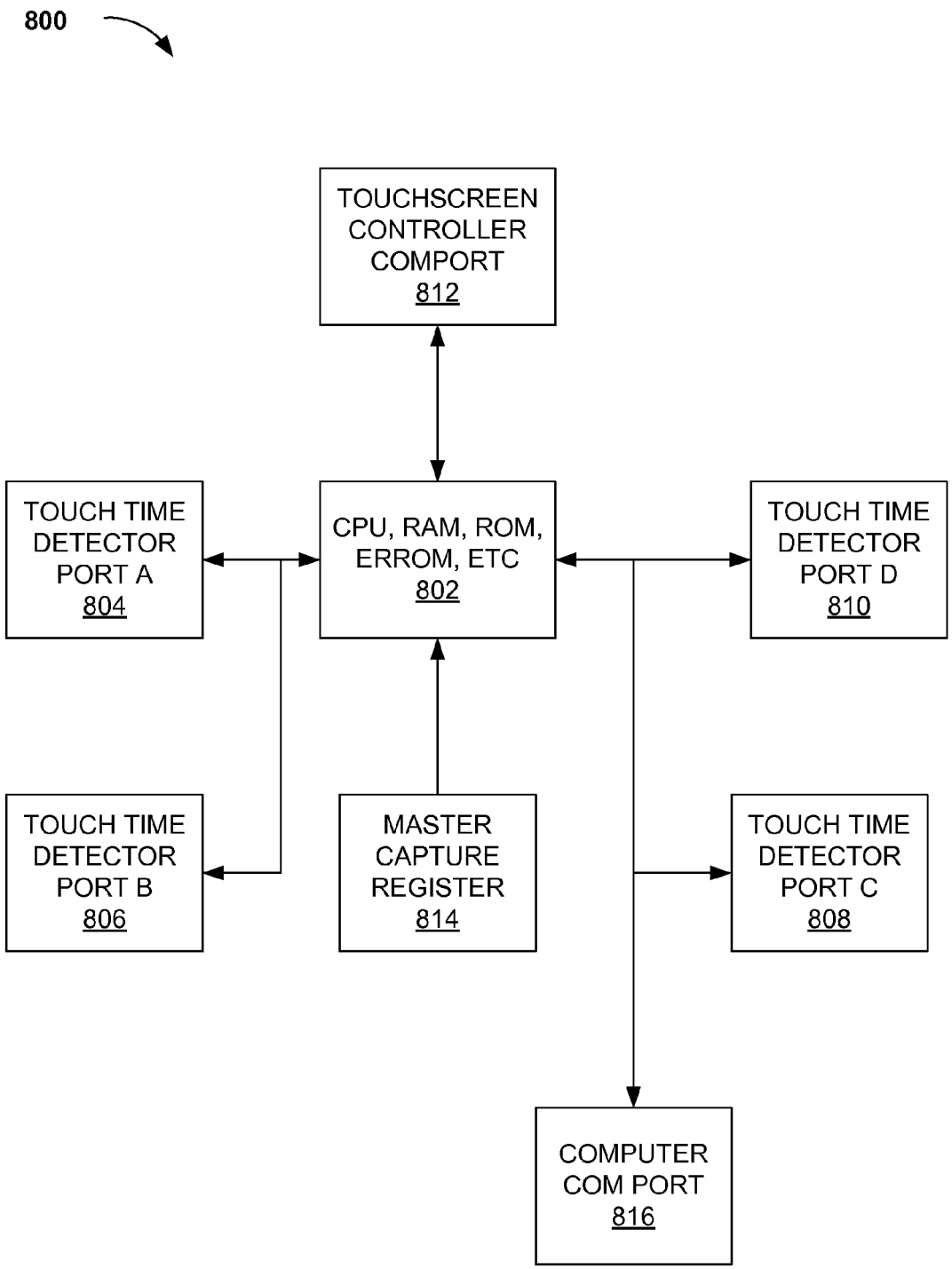
FIG. 8 depicts a system touch controller in accordance with one aspect of the invention.

FIG. 8 depicts a system touch controller 800 in accordance with one aspect of the invention. Referring to FIG. 8, a CPU, RAM, ROM and EPROM are represented in a block 802. The CPU 802 can communicate with each of the individual touch time detectors via ports 806. The touch time detector Ports A, B, C and D can be used for various positions, for example, around a gaming table. It will be appreciated that a master reset 314 and interface 322 can be processed through the touch time detector ports 806. When a touch is detected, touch information can be reported to an interface (e.g., a gaming computer or server) via a port 816.

Figure 9:
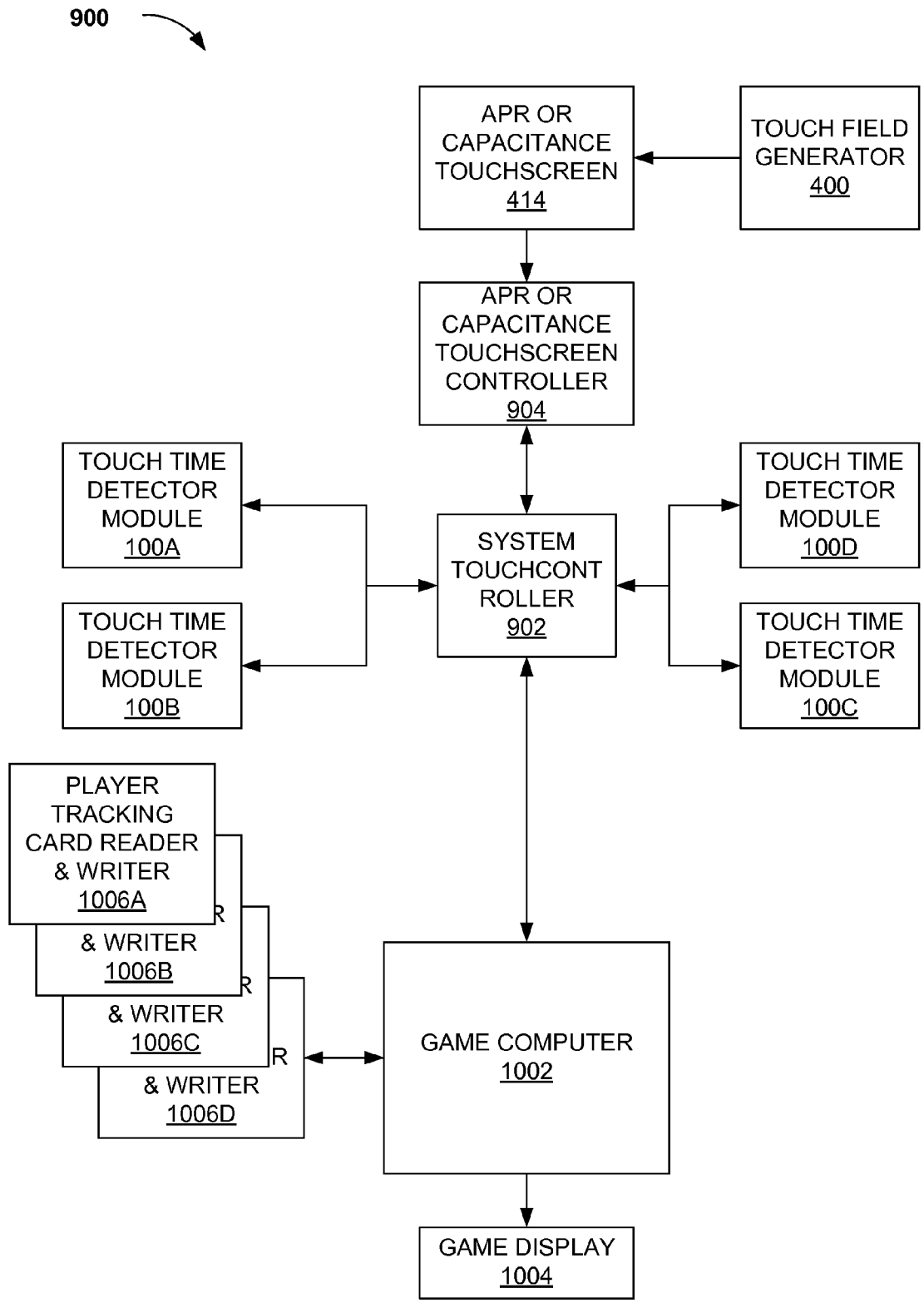
FIG. 9 depicts a gaming system in accordance with one embodiment of the invention.

FIG. 9 depicts a gaming system 900 in accordance with one embodiment of the invention. Referring to FIG. 9, a game computer 1002 is connected to a system touch controller 902 via a gaming computer communication port. A touch time detector module 100A is connected to the system touch controller 902 via a touch timer detector port A, a touch time detector module 100B is connected to the system touch controller 902 via a touch timer detector port B, and so on. An APR or capacitance touchscreen Controller 904 can connect to the system touch controller 902 via a touchscreen controller communication port. The APR or Capacitance Touchscreen 414 connects to the APR or Capacitance touchscreen controller 904. A touch field generator (or RF generator) 400 connects to the antenna touchscreen surface 414. As the gaming system 900 requires gaming related information and/or activities 1006 (e.g., player tracking cards or information, reader and writers to a gaming database), it can connect to the communication ports of the game computer 1002.

Figure 10:
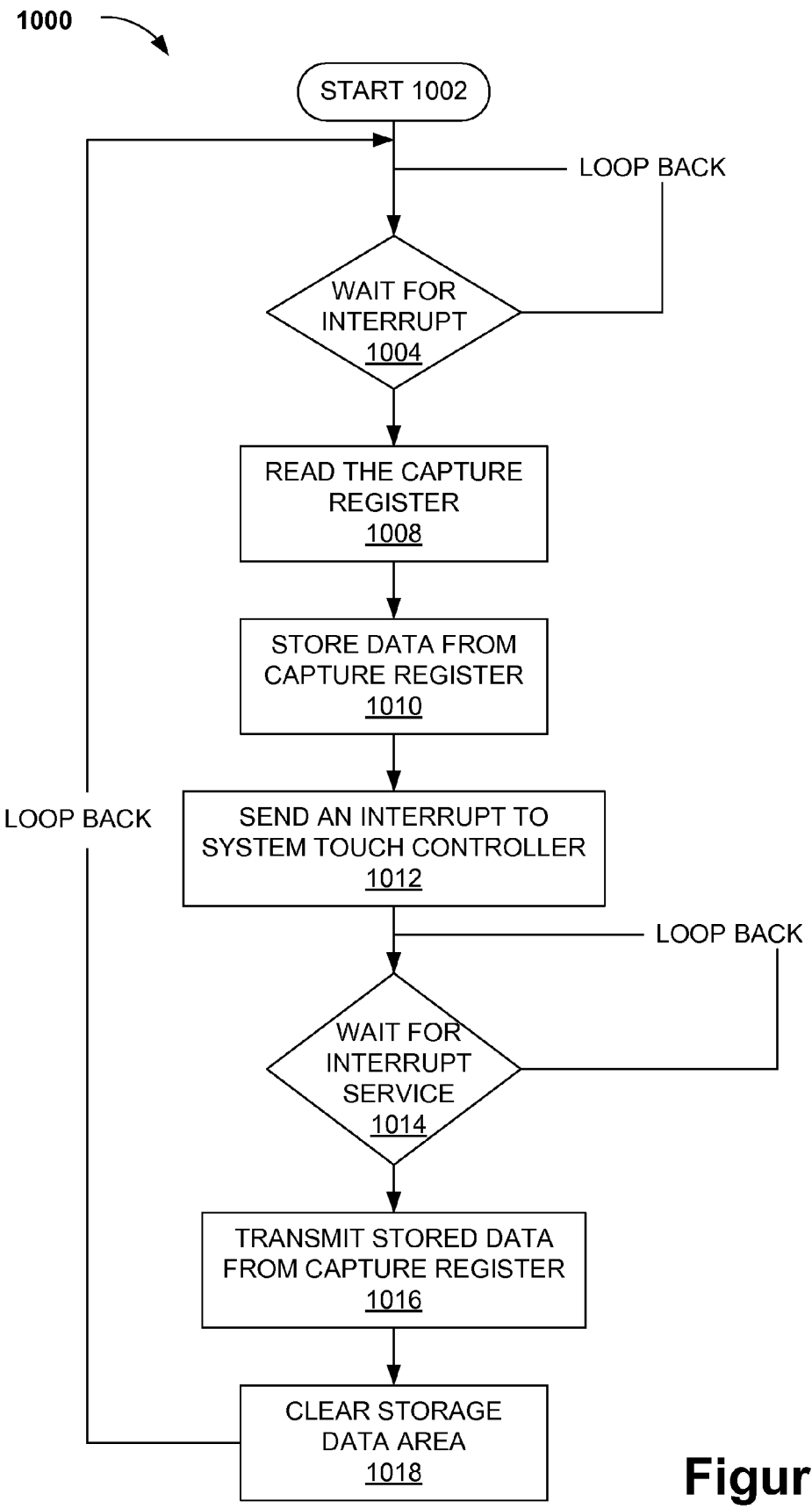
FIG. 10 depicts a method for detecting a touch on a multi-user touchscreen in accordance with one embodiment of the invention.

FIG. 10 depicts a method 1000 for detecting a touch on a multi-user touchscreen in accordance with one embodiment of the invention. The method 1000 can, for example, be used by the touch time detector module 100 (also shown in FIG. 1E). In effect, the method 1000 waits (1002) to receive an interrupt. An interrupt can be caused as a result of a high level of the RSSI Output 214 (shown in FIG. 2). Referring back to FIG. 2, the high level of the RSSI Output 214 is an indication of a player touching the Antenna 250 of the Touch Time Detector Module 100. When an interrupt occurs, the capture register is read (1008). Referring back to FIG. 3, the capture register 308 can be read by the CPU 318. In other words, the time count read from the capture register 308 can be stored (1010). Subsequently, an interrupt is sent to a system touch controller (e.g., a system touch controller 902 shown in FIG. 9). The system touch controller can process the data and signal back a signal to allow the method 1000 to continue. This can be achieved in wait for interrupt service (1014). If the interrupt is serviced, the method 1000 advances to transmit (1016) the stored data read from the capture register 1016 to the system touch controller Next, the RAM buffer holding the time count is then cleared (1018). The method 1000 can then proceed in a similar manner as described above to wait (1014) for an interrupt indicative of a touch on a touchscreen (e.g., an APR or Capacitance touchscreen 414 of FIG. 4).

Figure 11:
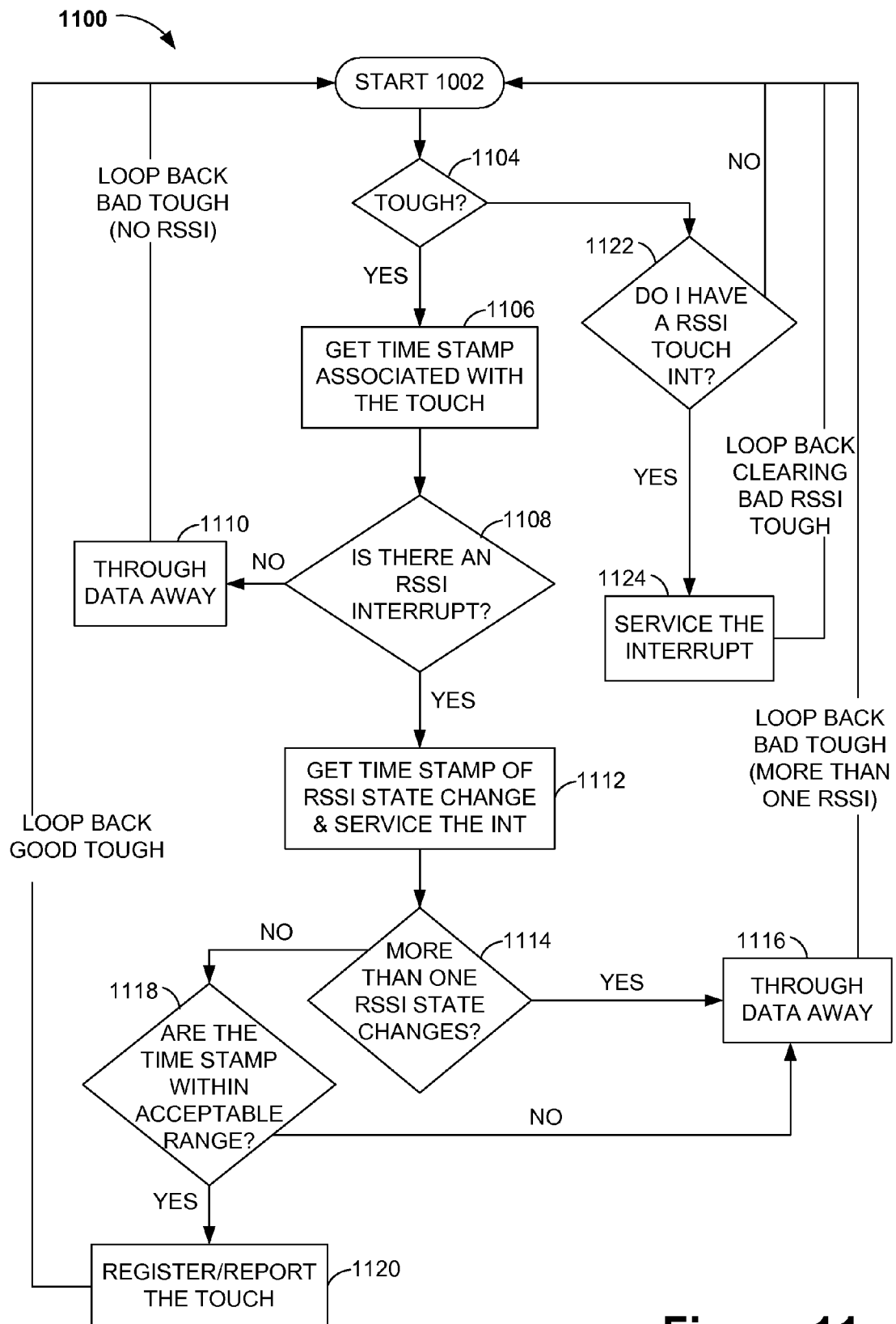
FIG. 11 depicts a method for determining whether a particular user has touched a multi-user touchscreen in accordance with one embodiment invention.

FIG. 11 depicts a method 1100 for determining whether a particular has touched a multi-user touchscreen in accordance with one embodiment invention. The method 1100 can, for example, be used by the system touch controller 800 of FIG. 8. Initially, it is determined (1104) whether a touch has been detected on the touchscreen (e.g., a touch detected on an APR or capacitance touchscreen). At 1104, a system touch controller (e.g., system touch controller 800) can effectively interrogate a touchscreen controller (e.g., touchscreen controller 414) to see whether a touch has been detected. If it is determined (1104) that no touch has been reported, the method 1100 proceeds to determine (1122) whether a RSSI touch interrupt is present. If it is determined (1122) that a RSSI interrupt is present, then the system services (1124) the Interrupt and the method 1100 proceeds to determine (1104) whether a touch has been detected. However, if it is determined (1122) that there is no RSSI touch interrupt, then method 1100 proceeds to determine (1104) whether a touch has been detected.

On the other hand, If it is determined (1104) that a touch has been detected, method 1100 proceeds to get a time stamp associated with the touch (1106). This means that at least the (X,Y) Cartesian coordinates of the touch location are available. Next, it is determined (1108) whether a RSSI Interrupt is present. If it is determined (1108) that the there is no RSSI interrupt, the method 1100 proceeds to effectively ignore the data and not register a touch. Subsequently, it is determined (1104) whether a touch has been detected and the method 1100 proceeds in a similar manner as noted above. However, if it is determined (1108) that there is an RSSI interrupt, the time stamp of the RSSI state change is obtained and the interrupt is serviced (1112). This means that the time when the touch was detected by the touchscreen and the time that the RSSI Interrupt are available. In addition, the (X,Y) Cartesian coordinates of the touch location is available. Subsequently, it is determined (1114) whether more than one RSSI state change has occurred. If it is determined (1114) that more than one RSSI state change has occurred, the data is discarded and no touch is registered. However, if it is determined (1114) that only one RSSI state change has occurred, the time stamps are within an acceptable range (e.g., 10 ms). If it is determined (1114) that the time stamps are not within the acceptable range, the data is discarded and no touch is registered (1116). However, If it is determined (1114) that the time stamps are within the acceptable range, the touch is registered and/or reported (1120). By way of example, the information associated with the touch, can be transmitted to the game computer 1002 of FIG. 9. After is registered and/or reported (1120), it is determined (1104) whether a touch has been detected and the method 1100 proceeds in a similar manner as discussed above.

Figure 12:
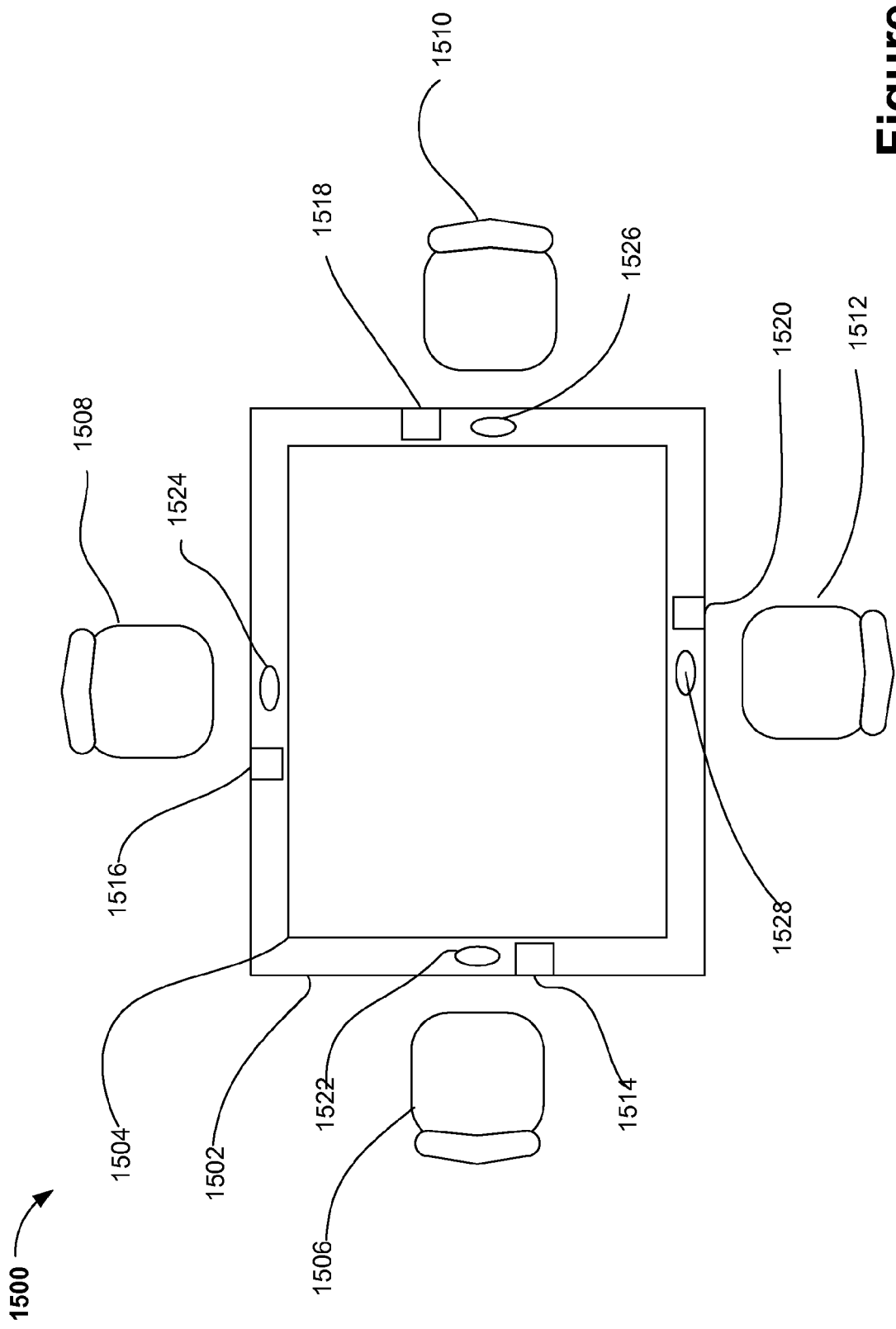
FIG. 12 depicts a top view of a gaming table in accordance with one embodiment of the invention.

FIG. 12 depicts a top view of a gaming table 1500 in accordance with one embodiment of the invention. Referring to FIG. 12, the gaming table 1500 provides four (4) playing positions and a common play field 1504. Each playing position can be used by a player who can play a game by interacting with the common play field 1504. In other words, the player can touch a touchscreen surface that serves as the common play field 1504. The input provided to the common play field 1504 can be provided to a gaming machine and/or server (e.g., gaming computer 1002). In the exemplarily configuration depicted in FIG. 12, four chairs 1506, 1508, 1510 and 1512 are provided around the tabletop 1502. In addition, player tracking card reader writer 1514, 1516, 1518, and 1520 are provided for performing various gaming operations. It should be noted that four touch detectors 1522, 1524, 1526, and 1528 are located in proximity of the four chairs 1506, 1508, 1510 and 1512 to detect when a player touches the common play field 1504. As such, the touch detector 1522 can detect a touch by the player seated in seat 1506, and so on.

Figure 13:
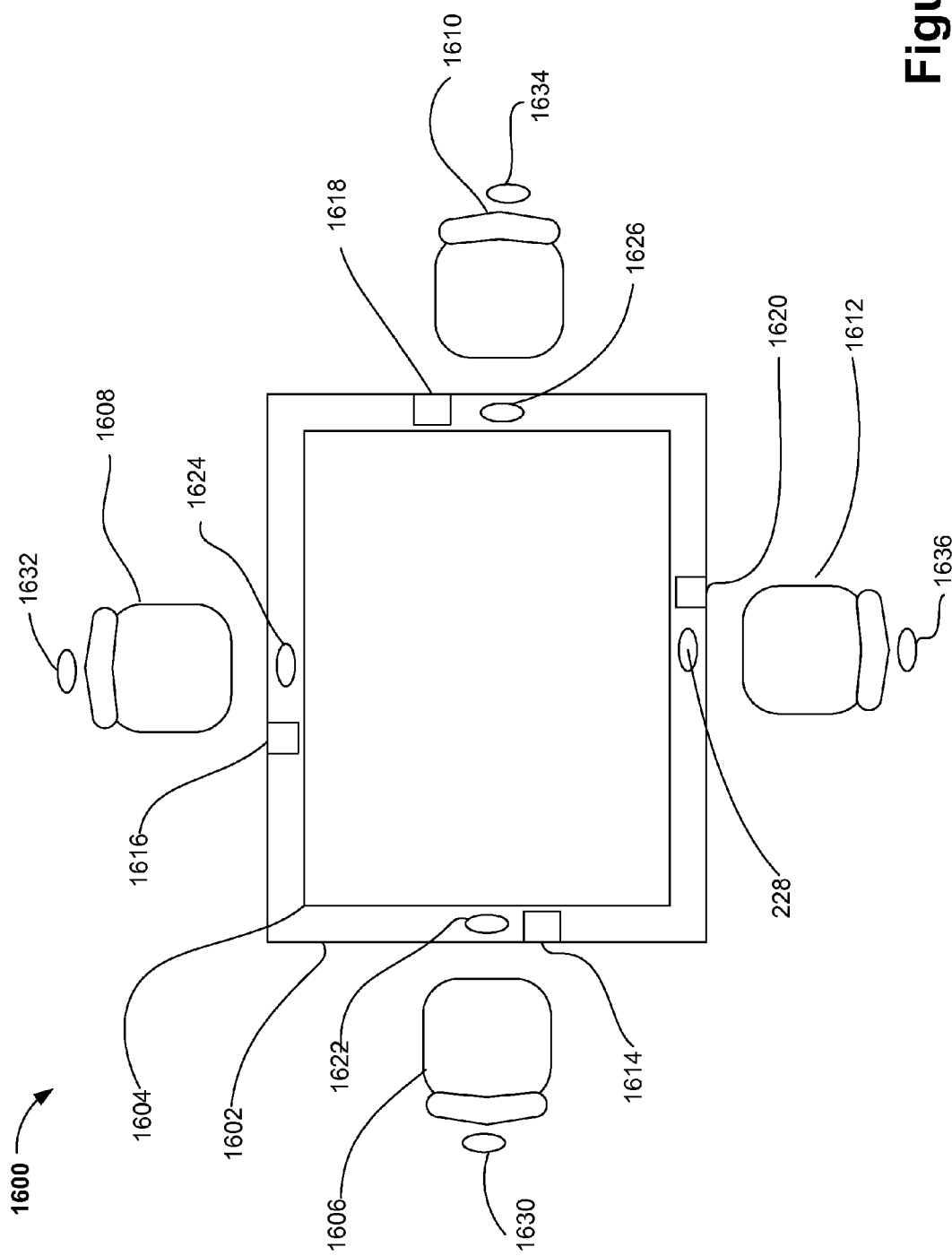
FIG. 13 depicts a top view of a four-place gaming table in accordance with another embodiment of the invention.

FIG. 13 depicts a top view of a four-place gaming table 1600 in accordance with another embodiment of the invention. In this configuration, four chairs 1606, 1608, 1610 and 1612 are arranged around the tabletop 1602. Each chair can support a player. Player tracking card reader writer 1614, 1616, 1618, and 1620 are provided of the players. Four touch detectors 1622, 1624, 1626, and 1628 are also provided for the players. In addition, there are four touch field generators 1630, 1632, 1634 and 1636 are located behind the players.

Figure 14:
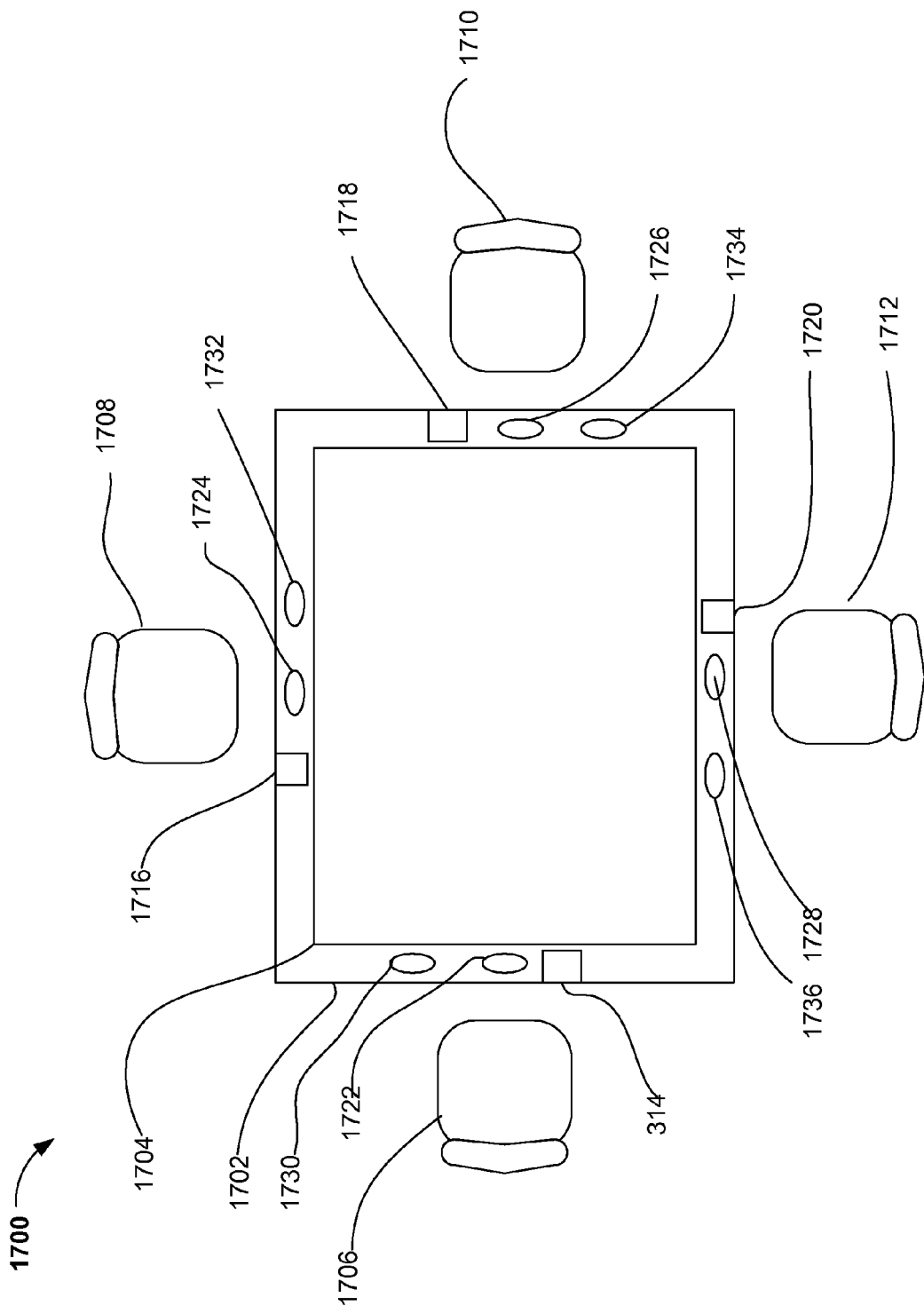
FIG. 14 depicts a top view four place gaming table in accordance with yet another embodiment of the invention.

FIG. 14 depicts a top view four place gaming table 1700 in accordance with yet another embodiment of the invention. Referring to FIG. 13, a common play Field 1704 can be used by four players sited in four Chairs 1706, 1708, 1710 and 1712. Player tracking card reader writer 1714, 1716, 1718 and 1720 and touch detectors 1722, 1724, 1726 and 1728. There touch field generators 1730, 1732, 1734 and 1736 are provided in front of the players.

Figure 15:
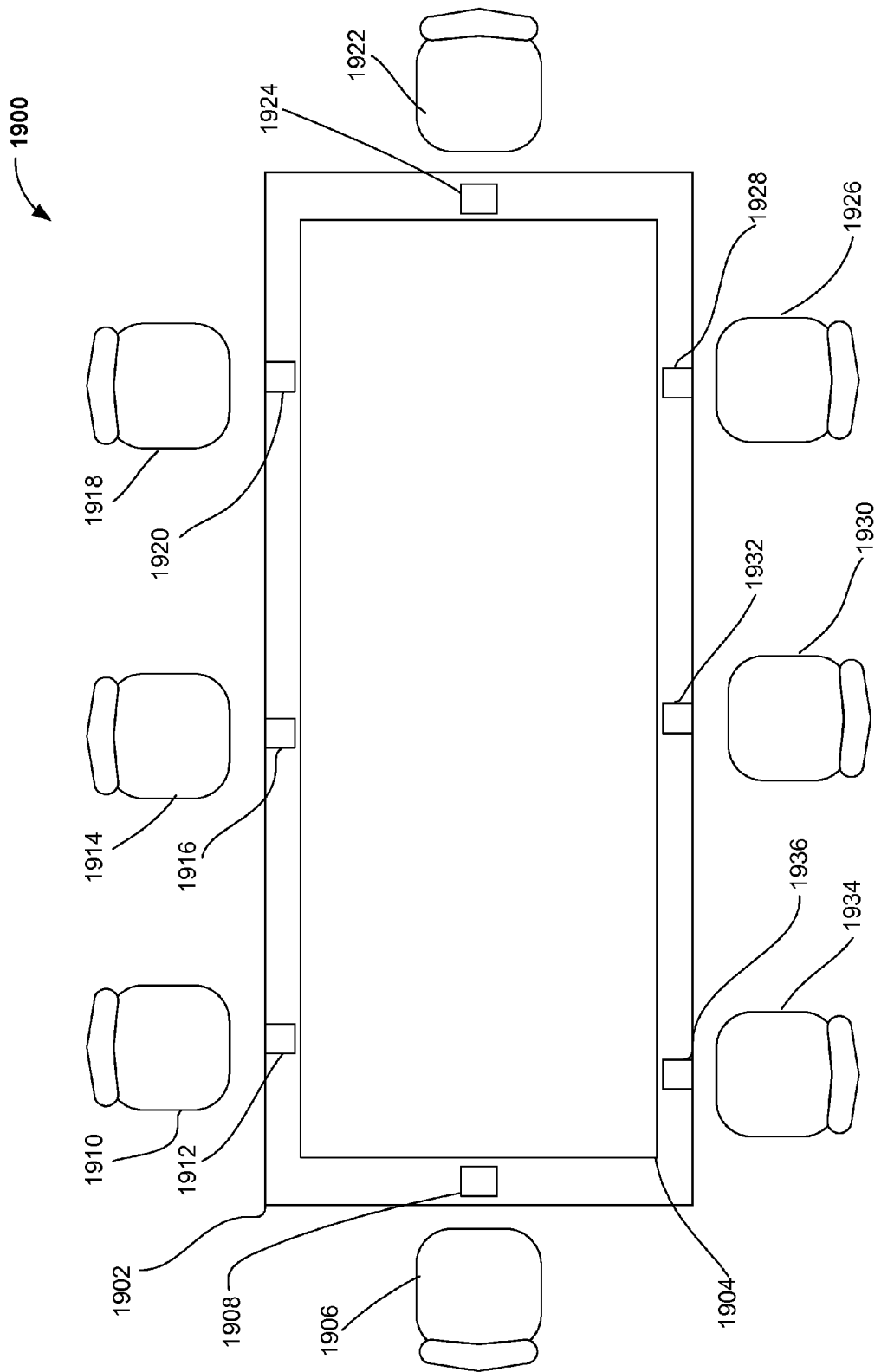
FIG. 15 depicts a top view of an eight-place gaming table in accordance with one embodiment of the invention.

FIG. 15 depicts a top view of an eight-place gaming table 1900 in accordance with one embodiment of the invention. A common play field 1904 is provided. In this exemplary configuration eight chairs 1906, 1910, 1914, 1918, 1922, 1926, 1930 and 1934 are arranged around the tabletop 1902. In addition, player tracking card reader writer 1908, 1912, 1916, 1920, 1924, 1928, 1932, and 1936 are provided for players.

Figure 16:
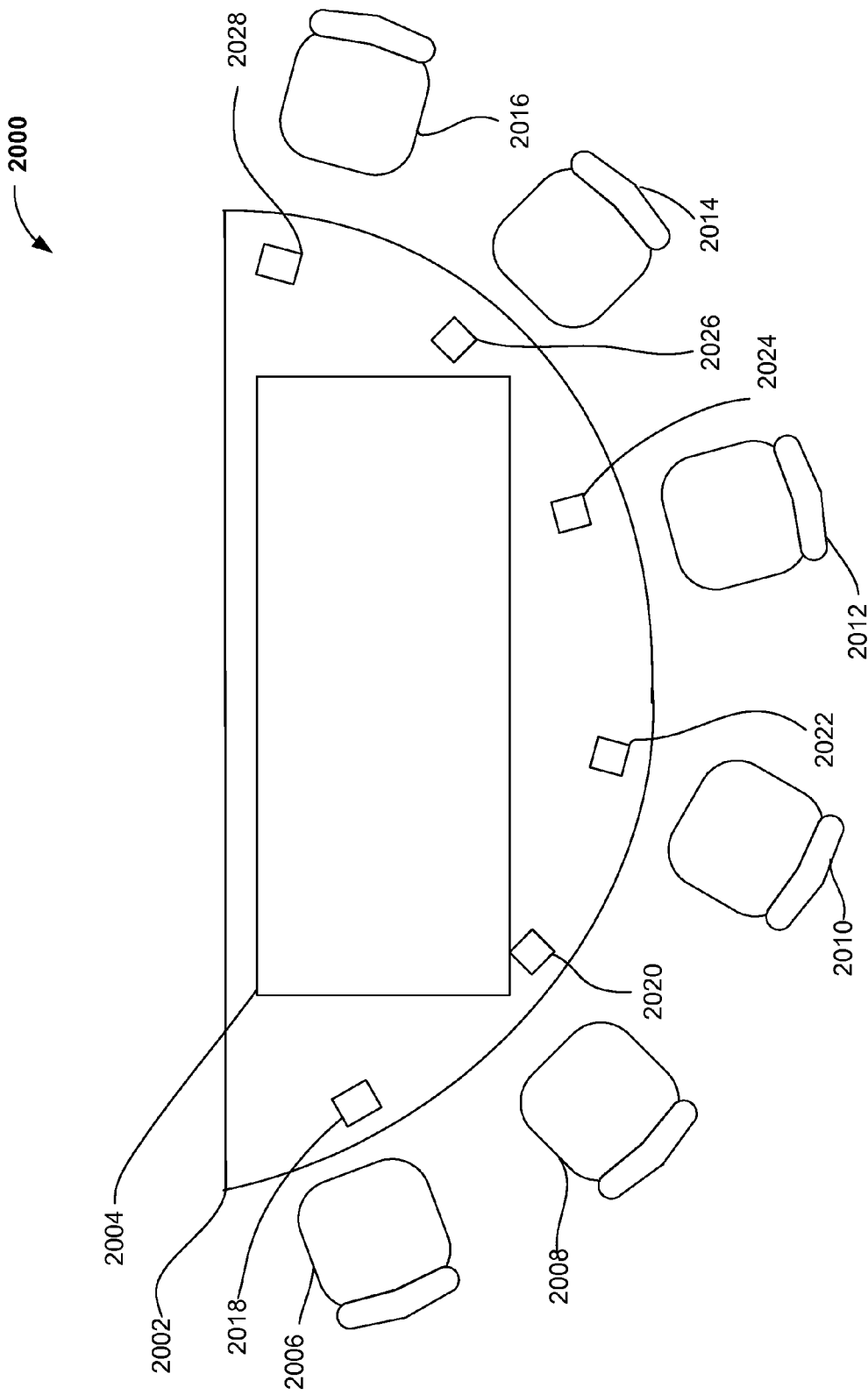
FIG. 16 depicts a top view of a six-place gaming table in accordance with one embodiment of the invention.

FIG. 16 depicts a top view of a six-place gaming table 2000 in accordance with one embodiment of the invention. Referring to FIG. 15, a common play field 2004 is provided. In this configuration, six (6) chairs 2006, 2008, 2010, 2012, 2014 and 2016 are arranged around a tabletop 2002. In addition, player tracking card reader writer 2018, 2020, 2022, 2024 and 2028 are provided for the players.

In view of the foregoing it will be apparent that a common play field can be provided for various gaming applications using touchscreens devices in accordance with various embodiments of the invention. For example, multi-user multi-touch system can be provided for a gaming apparatus or gaming machine. The touchscreen provided by the multi-user multi-touch system can be integrated with the gaming apparatus or gaming machine. Further, the touchscreen can be controlled by a touchscreen controller that can time stamp the (x,y) Cartesian coordinates of touches detected by the touchscreen. The time stamps can, for example, be synchronized time stamps. The synchronized time stamps can effectively be used by a synchronizer/controller system. The touchscreen controller can communicate with and accept commands from the synchronizer/controller system. The communication can, for example include the (x, y) Cartesian coordinates of the location of the touch, synchronized time stamps, and commands. The touchscreen controller can store the (x,y) Cartesian coordinates of the touch in a buffer (e.g., a designated touch buffer) after it determines or calculates the (x,y) Cartesian coordinates of a touch.

The invention also contemplates an input device provided as a multiplayer touchscreen surface for a gaming apparatus or gaming machine. The surface of the multiplayer touchscreen can be made available to players and the player can interact with a game by touching the surface of the touchscreen.

The surface can, for example, be the top of a common display device. The multiplayer touchscreen surface cab, for example include an APR touchscreen operatively connected to an APR touchscreen controller, or a capacitance touchscreen operatively connected to a capacitive touchscreen controller.

It will also be appreciated that touch time detectors can be positioned at each of a number of playing stations each designated for a player. The Touch time detectors can include a time detecting module that can, for example, be a RF receiver. The RF receiver can have a Receiver Signal Strength Indicator (RSSI) output effectively providing an output proportional to the RF signal received. A touch time detector can also include a time capture module synchronized by an input from a system touch controller. A capture register can be operatively connected in such a way to capture the event time of a change in the RSSI output.

The capture register can also be operatively connected to a CPU so that the captured event time can be transmitted via a communication module to the system touch controller.

A touch field generator can be operatively connected to a transparent conductive coating on the top surface of an APR touchscreen. The APR touchscreen can be coated with a transparent conductive layer of Indium Tin Oxide. The transparent conductive layer of Indium Tin Oxide can be coated with a protective hard coating of Silicon Dioxide. The touch field generator can be operatively connected to a transparent conductive on the top surface of a capacitance touchscreen. The touch field generator can generate an RF field on and about a multiplayer touchscreen surface. A system touch controller can be operatively connected to a touchscreen controller, a plurality of touch time detectors and a game computer. The game computer is operatively connected to a game display, system touch controller and a system computer.

Multiple touches from multiple players can be processed to identify the player that has touched the touchscreen. Time-tagged events can be processed to determine if the events are related in time and may be considered to be effectively occurring at the same time. In addition, sensitivity of a touch time detector can be adjusted, for example, by changing the sensitivity as a function of changing ambient conditions associated with the position where an individual player is situated. These techniques can be applied for processing touches on an APR and capacitance touchscreens and for associating a synchronized time with the events occurring and/or reported by APR and capacitance touchscreens.

RF frequency can be the frequency or rate of oscillation within the range of about 3 Hz and 30 GHz. This range corresponds to frequency of alternating current electrical signals used to produce and detect radio waves.

Many different types of games, including mechanical slot games, video slot games, video poker, video black jack, video pachinko and lottery, may use the input system and/or input processing techniques of the present invention. In particular, a gaming machine may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine may be stored as game software on a mass storage device in the gaming machine or may be generated on a remote gaming device but then displayed on the gaming machine. The gaming machine may execute game software, such as but not limited to video streaming software that allows the game to be displayed on the gaming machine. When an instance is stored on the gaming machine, it may be loaded from the mass storage device into a RAM for execution. In some cases, after a selection of an instance, the game software that allows the selected instance to be generated may be downloaded from a remote gaming device, such as another gaming machine.

Understand that a gaming machine is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in gaming computers typically have two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, titled "Process Verification," which is hereby incorporated herein in its entirety for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A multi-user multi-touch input system for use by a plurality of users as an input device, said multi-user multi-touch input system comprising:
    an input portion capable of being touched by said plurality of users;
    a user-identifier component configured and operable to:
        detect that a particular one of said plurality of users has touched said input portion of said multi-user input device, and
        provide a user-identification and an identification-time, wherein said user-identification identifies said particular user and said identification-time includes a first touch time indicating the time when a touch has been detected by said user-identifier component, the combination of said user-identification and identification-time indicating that a touch by said particular user at said first touch-time has been detected by said user-identifier component;
    a touch-locator component configured and operable to:
        detect a touch at a particular location of said input portion of said multi-user input device, and
        provide a touch-location and a location-time, wherein said touch-location identifies said particular location of a touch detected by said touch-locator on said input portion of said multi-user multi-touch device and said location-time includes a second touch time indicating the time when a touch has been detected by said touch-location component, the combination of said touch-location and location-time indicating that a touch at said location has been detected by said touch-locator component; and
    a synchronizing/controller component configured and operable to:
        receive from said user-identifier component said user-identification and identification-time,
        receive from said touch-locator component said touch-location and a location-time,
        determine, based on said identification-time and location-time, whether said particular user has touched said input portion at said particular location of said input portion of said multi-user multi-touch input system, and
        generate as output an indication that indicates that said particular user identified by said user-identifier component has touched said input portion of said multi-user multi-touch input system at said particular location identified by said touch-location when said determining determines that said particular user has touched said input portion at said location of said input portion of said multi-user multi-touch device.

2. The multi-user multi-touch input system of claim 1, wherein said user-identifier component is further configured and operable to: detect a change in Radio Frequency (RF) energy received by a RF receiver associated with said particular user when said particular user touches said input portion of said multi-user multi-touch input system.

3. The multi-user multi-touch input system of claim 1, wherein said synchronizing/controller component is further configured and operable to:
    determine whether said first time of said identification-time and said second time of said location-time are within an acceptable range; and
    determine that said particular users has touched said input portion at said particular location when it is determined that said first and second time are within said acceptable range.

4. The multi-user multi-touch input system of claim 1, wherein said synchronizing/controller component is further configured and operable to:
    ignore touches detected by said touch-locator component when said user-identifier does not detect a touch by one of said plurality of users, thereby allowing touches of non-users to be ignored.

5. The multi-user multi-touch input system of claim 1, wherein said synchronizing/controller component is further configured and operable to:
    ignore one or more touches detected by said touch-locator component when within a determined time period said user-identifier identifies two or more users that have touched said input surface.

6. The multi-user multi-touch input system of claim 1, wherein said synchronizing/controller component is further configured and operable to:
 detect that the same user identified by said user-identifier component has touched said particular location multiple times during a determined period of time.

7. The multi-user multi-touch input system of claim 6, wherein said synchronizing/controller component is further configured and operable to detect that said particular user had held a constant touch at said particular location.

8. The multi-user multi-touch input system of claim 1, wherein said acceptable range is about 10 milliseconds (10 ms).

9. The multi-user multi-touch input system of claim 1, wherein said user-identifier component comprises:
 at least one radio frequency (RF) generator; and
 a plurality RF receivers capable of detecting RF energy from the RF generator, wherein for each of said plurality of users at least one RF receiver is provided to detect a change in the RF energy transmitted by said RF generator when a user touches said input portion of said multi-user multi-touch input system.

10. The multi-user multi-touch input system of claim 9, wherein all of said plurality RF receivers are tuned to the same RF frequency.

11. The multi-user multi-touch input system of claim 9, wherein said touch locator component includes an Acoustic Pulse Recognition (APR) or a capacitance touch screen configured to detect a touch at a particular location.

12. The multi-user multi-touch input system of claim 9, wherein said Acoustic Pulse Recognition (APR) or a capacitance touch screen are integrated with a gaming machine.

13. The multi-user multi-touch input system of claim 9, wherein said Acoustic Pulse Recognition (APR) touch screen or a capacitance touch screen are multi-touch screen capable of detecting multiple touches at the same time.

14. The multi-user multi-touch input system of claim 9, wherein said RF generator is operatively connected to a transparent conductive coating on a top surface of said Acoustic Pulse Recognition (APR) touchscreen or capacitance touchscreen.

15. The multi-user multi-touch input system of claim 14, wherein said Acoustic Pulse Recognition (APR) touchscreen is coated with a conductive layer of Indium Tin Oxide.

16. The multi-user multi-touch input system of claim 1, wherein said input device is provided for one or more gaming applications.

17. The multi-user multi-touch input system of claim 1, wherein said input device is provided for one or more gaming applications, said one or more gaming applications including one or more of the following: a roulette game, a craps game, a card game, a poker game.

18. A computer-implemented method for providing a multi-user input system for use as input device by a plurality of users, said computer-implemented method comprising:
 initiating a user-identifier component and a input-locator component, wherein said user-identifier and input-locator components operate independently from each other,
 said user-identifier component being configured to:
  identify a particular user of said plurality of users when said user-identifier component detects that said particular user has provided input to said multi-user input system, and
  provide a first indication, the first indication including a user-identification and an identification-time, wherein said user-identification identifies said particular user and said identification-time includes a first touch time indicating the time when a touch has been detected by said user-identifier component, the combination of said user-identification and identification-time indicating that a touch by said particular user at said first touch-time has been detected by said user-identifier component, and
 said input-locator component being configured to:
  identify a location for input provided to said multi-user input system when said input-locator detects that input has been provided at said particular location of said multi-user input system, and
  provide a second indication, the second indication including a touch-location and a location-time, wherein said touch-location identifies said particular location of a touch detected by said touch-locator on said input portion of said multi-user multi-touch device and said location-time includes a second touch time indicating the time when a touch has been detected by said touch-location component, the combination of said touch-location and location-time indicating that touch at said location has been detected by said touch-locator component;
 receiving, at a controller, said first indication from said user-identifier component that indicates a particular user has provided input to said multi-user input system, and said second indication from said input-locator component that input has been provided to said multi-user input system;
 reconciling, at said controller, said first and second indications to determine, based on said identification-time and location-time, whether said particular user has provided input to said multi-user input system at said particular location; and
 reporting, at said controller, a touch by said particular user at said particular location of said multi-user input system.

19. The computer-implemented method of claim 18, wherein said reconciling of said first and second indications comprises one or more of the following:
 determining timing information provided by said first and second indications,
 determining whether multiple users have been identified within a determined period of time by said user-identifier system;
 determining whether multiple input has been detected by said input-locator within a determined amount of time that said user-identifier system has identified said particular user; and
 determining whether multiple input has been detected at the same location by said input-locator within a determined amount of time that said user-identifier system has indicated that one or more users have provided input.

20. A non-transitory computer-readable storage medium with an executable program stored thereon, wherein the program instructs a microprocessor to perform the following steps:
 initiate a user-identifier component and a input-locator component, wherein said user-identifier and input-locator components operate independently from each other,
 said user-identifier component being configured to:
  identify a particular user of said plurality of users when said user-identifier component detects that said particular user has provided input to said multi-user input system,
  provide a first indication, the first indication including a user-identification and an identification-time, wherein said user-identification identifies said particular user and said identification-time includes a first touch time indicating the time when a touch has been detected by said user-identifier component, the combination of said user-identification and identification-time indicate that touch by said particular user at said first touch-time has been detected by said user-identifier component, and said input-locator component being configured to:
  identify a location for input provided to said multi-user input system when said input-locator detects that input has been provided at said particular location of said multi-user input system, and
  provide a second indication, the second indication including a touch-location and a location-time, wherein said touch-location identifies said particular location of a touch detected by said touch-locator on said input portion of said multi-user multi-touch device and said location-time includes a second touch time indicating the time when a touch has been detected by said touch-location component, the combination of said touch-location and location-time indicate that a touch at said location has been detected by said touch-locator component;

receive, at a controller, said first indication from said user-identifier component that indicates a particular user has provided input to said multi-user input system, and said second indication from said input-locator component that input has been provided to said multi-user input system;

reconcile, at said controller, said first and second indications to determine, based on said identification-time and location-time, whether said particular user has provided input to said multi-user input system at said particular location; and report, at said controller, a touch by said particular user at said particular location of said multi-user input system.

21. A gaming apparatus for a plurality of players, comprising:
  a touch-surface that serves as a common input area for playing a game by said plurality of players;
  a user-identifier component configured to:
    detect which one of said players has touched said common input area and communicate an identifier associated with said player to a controller, and
    provide a user-identification and identification-time, wherein said user-identification identifies said particular user and said identification-time includes a first touch time indicating the time when a touch has been detected by said user-identifier component, the combination of said user-identification and identification-time indicate that a touch by said particular user at said first touch-time has been detected by said user-identifier component;
  a touch-location component configured to:
    detect a touch at a particular location of said common input area,
    provide a touch-location and a location-time, wherein said touch-location identifies said particular location of a touch detected by said touch-location component on said common input area and said location-time includes a second touch time indicating the time when a touch has been detected by said touch-location component, the combination of said touch-location and location-time indicate that a touch at said location has been detected by said touch-location component, and
    communicate the location of the touch to said controller;
  said controller being configured to;
    receive from said user-identifier component said user-identification and identification time
    receive from said touch-location component said touch-location and a location-time,
    determine, based on said identification-time and location-time, whether said particular user has touched said input portion at said particular location of said common input area, and
    generate as output an indication that indicates that said particular player identified by said user-identifier component has touched said common input area at the location indicated by said touch-location component when said determining determines that said particular user has touched said input portion at said location of said common input area.

22. A gaming apparatus as recited in claim 21, wherein said controller is provided by a gaming server that is in communication with said gaming apparatus.

23. A gaming apparatus as recited in claim 21, wherein said gaming server manages said game.

24. A gaming apparatus as recited in claim 21, wherein said controller is provided by said gaming apparatus.

* * * * *